United States Patent
Kitamura

(10) Patent No.: US 6,885,756 B2
(45) Date of Patent: Apr. 26, 2005

(54) APPARATUS AND METHOD FOR EMBEDDING WATERMARK INFORMATION IN COMPRESSED IMAGE DATA, AND APPARATUS AND METHOD FOR RETRIEVING WATERMARK INFORMATION FROM COMPRESSED IMAGE DATA HAVING WATERMARK INFORMATION EMBEDDED THEREIN

(75) Inventor: Shinji Kitamura, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 667 days.

(21) Appl. No.: 10/046,484

(22) Filed: Jan. 16, 2002

(65) Prior Publication Data

US 2002/0085737 A1 Jul. 4, 2002

(30) Foreign Application Priority Data

Feb. 1, 2001 (JP) ........................................ 2001-025664

(51) Int. Cl.$^7$ ................................................ G06K 9/00
(52) U.S. Cl. ...................................... 382/100; 713/176
(58) Field of Search ................................. 382/100, 232; 380/51, 54, 210, 252, 287; 713/176, 179; 370/522, 527, 529; 358/3.28; 725/20

(56) References Cited

U.S. PATENT DOCUMENTS

| | | | |
|---|---|---|---|
| 5,745,606 A | | 4/1998 | Yoshimichi |
| 5,761,686 A | * | 6/1998 | Bloomberg ................ 715/529 |
| 6,192,138 B1 | * | 2/2001 | Yamadaji .................. 382/100 |
| 6,343,138 B1 | * | 1/2002 | Rhoads ..................... 382/100 |
| 6,590,998 B2 | * | 7/2003 | Rhoads ..................... 382/100 |
| 6,834,344 B1 | * | 12/2004 | Aggarwal et al. .......... 713/176 |

FOREIGN PATENT DOCUMENTS

| | | |
|---|---|---|
| JP | 2000-13764 A | 1/2000 |
| JP | 2000-32406 A | 1/2000 |
| JP | 2000-151973 A | 5/2000 |
| JP | 2001-7705 A | 1/2001 |
| JP | 2001-24876 A | 1/2001 |

\* cited by examiner

*Primary Examiner*—Bhavesh M. Mehta
*Assistant Examiner*—Abolfazl Tabatabai
(74) *Attorney, Agent, or Firm*—McDermott Will & Emery LLP

(57) ABSTRACT

A variable length decoding section extracts a codeword and an additional bit or bits corresponding to the codeword from compressed image data based on a code table. An embedding section embeds watermark information in a prescribed bit of the additional bits extracted by the variable length decoding section. A data connecting section connects the additional bits having the watermark information embedded therein by the embedding section with the codeword extracted by the variable length decoding section to produce a variable length code.

31 Claims, 24 Drawing Sheets

FIG. 4

| GROUP NO. SSSS | QUANTIZED DCT COEFFICIENT VALUE Dq | NUMBER OF ADDITIONAL BITS |
|---|---|---|
| 0 | 0 | 0 |
| 1 | -1、+1 | 1 |
| 2 | -3、-2、+2、+3 | 2 |
| 3 | -7、··、-4、+4、··、+7 | 3 |
| 4 | -15、··、-8、+8、··、+15 | 4 |
| 5 | -31、··、-16、+16、··、+31 | 5 |
| 6 | -63、··、-32、+32、··、+63 | 6 |
| 7 | -127、··、-64、+64、··、+127 | 7 |
| 8 | -255、··、-128、+128、··、+255 | 8 |
| 9 | -511、··、-256、+256、··、+511 | 9 |
| 10 | -1023、··、-512、+512、··、+1023 | 10 |
| 11 | -2047、··、-1024、+1024、··、+2047 | 11 |

FIG. 5

| ADDITIONAL BITS ADBIT | DCT COEFFICIENT Dq |
|---|---|
| 0000 | -15 |
| 0001 | -14 |
| 0010 | -13 |
| 0011 | -12 |
| 0100 | -11 |
| 0101 | -10 |
| 0110 | -9 |
| 0111 | -8 |
| 1000 | +8 |
| 1001 | +9 |
| 1010 | +10 |
| 1011 | +11 |
| 1100 | +12 |
| 1101 | +13 |
| 1110 | +14 |
| 1111 | +15 |

FIG. 6

| RUN/GROUP NO. | CODE LENGTH | CODEWORD | RUN/GROUP NO. | CODE LENGTH | CODEWORD |
|---|---|---|---|---|---|
| 0/0 (EOB) | 4 | 1010 | | | |
| 0/1 | 2 | 00 | 5/1 | 7 | 1111010 |
| 0/2 | 2 | 01 | 5/2 | 11 | 11111110111 |
| 0/3 | 3 | 100 | 5/3 | 16 | 1111111110011110 |
| 0/4 | 4 | 1011 | 5/4 | 16 | 1111111110011111 |
| 0/5 | 5 | 11010 | 5/5 | 16 | 1111111110100000 |
| 0/6 | 7 | 1111000 | 5/6 | 16 | 1111111110100001 |
| 0/7 | 8 | 11111000 | 5/7 | 16 | 1111111110100010 |
| 0/8 | 10 | 1111110110 | 5/8 | 16 | 1111111110100011 |
| 0/9 | 16 | 1111111110000010 | 5/9 | 16 | 1111111110100100 |
| 0/A | 16 | 1111111110000011 | 5/A | 16 | 1111111110100101 |
| 1/1 | 4 | 1100 | 6/1 | 7 | 1111011 |
| 1/2 | 5 | 11011 | 6/2 | 12 | 111111110110 |
| 1/3 | 7 | 1111001 | 6/3 | 16 | 1111111110100110 |
| 1/4 | 9 | 111110110 | 6/4 | 16 | 1111111110100111 |
| 1/5 | 11 | 11111110110 | 6/5 | 16 | 1111111110101000 |
| 1/6 | 16 | 1111111110000100 | 6/6 | 16 | 1111111110101001 |
| 1/7 | 16 | 1111111110000101 | 6/7 | 16 | 1111111110101010 |
| 1/8 | 16 | 1111111110000110 | 6/8 | 16 | 1111111110101011 |
| 1/9 | 16 | 1111111110000111 | 6/9 | 16 | 1111111110101100 |
| 1/A | 16 | 1111111110001000 | 6/A | 16 | 1111111110101101 |
| 2/1 | 5 | 11100 | 7/1 | 8 | 11111010 |
| 2/2 | 8 | 11111001 | 7/2 | 12 | 111111110111 |
| 2/3 | 10 | 1111110111 | 7/3 | 16 | 1111111110101110 |
| 2/4 | 12 | 111111110100 | 7/4 | 16 | 1111111110101111 |
| 2/5 | 16 | 1111111110001001 | 7/5 | 16 | 1111111110110000 |
| 2/6 | 16 | 1111111110001010 | 7/6 | 16 | 1111111110110001 |
| 2/7 | 16 | 1111111110001011 | 7/7 | 16 | 1111111110110010 |
| 2/8 | 16 | 1111111110001100 | 7/8 | 16 | 1111111110110011 |
| 2/9 | 16 | 1111111110001101 | 7/9 | 16 | 1111111110110100 |
| 2/A | 16 | 1111111110001110 | 7/A | 16 | 1111111110110101 |
| 3/1 | 6 | 111010 | 8/1 | 9 | 111111000 |
| 3/2 | 9 | 111110111 | 8/2 | 15 | 111111111000000 |
| 3/3 | 12 | 111111110101 | 8/3 | 16 | 1111111110110110 |
| 3/4 | 16 | 1111111110001111 | 8/4 | 16 | 1111111110110111 |
| 3/5 | 16 | 1111111110010000 | 8/5 | 16 | 1111111110111000 |
| 3/6 | 16 | 1111111110010001 | 8/6 | 16 | 1111111110111001 |
| 3/7 | 16 | 1111111110010010 | 8/7 | 16 | 1111111110111010 |
| 3/8 | 16 | 1111111110010011 | 8/8 | 16 | 1111111110111011 |
| 3/9 | 16 | 1111111110010100 | 8/9 | 16 | 1111111110111100 |
| 3/A | 16 | 1111111110010101 | 8/A | 16 | 1111111110111101 |
| 4/1 | 6 | 111011 | 9/1 | 9 | 111111001 |
| 4/2 | 10 | 1111111000 | 9/2 | 16 | 1111111110111110 |
| 4/3 | 16 | 1111111110010110 | 9/3 | 16 | 1111111110111111 |
| 4/4 | 16 | 1111111110010111 | 9/4 | 16 | 1111111111000000 |
| 4/5 | 16 | 1111111110011000 | 9/5 | 16 | 1111111111000001 |
| 4/6 | 16 | 1111111110011001 | ⎰ | ⎰ | ⎰ |
| 4/7 | 16 | 1111111110011010 | | | |
| 4/8 | 16 | 1111111110011011 | F/8 | 16 | 1111111111111100 |
| 4/9 | 16 | 1111111110011100 | F/9 | 16 | 1111111111111101 |
| 4/A | 16 | 1111111110011101 | F/A | 16 | 1111111111111110 |

|  | MINIMUM VALUE MIN | MAXIMUM VALUE MAX |
|---|---|---|
| ACCUMULATED VALUE OF (RRRR+1) | 5 | 20 |

| CODEWORD (CODE) | 11111001 | 111011 | 111110111 | 1111011 | 1111010 | ... |
|---|---|---|---|---|---|---|
| CODEWORD LENGTH (L) | 8 | 6 | 9 | 7 | 7 | ... |
| ADDITIONAL BITS (ADBIT) | 10 | 0 | 01 | 1 | 0 | ... |
| ADDITIONAL-BIT LENGTH (M) | 2 | 1 | 2 | 1 | 1 | ... |
| RRRR/SSSS | 2/2 | 4/1 | 3/2 | 6/1 | 5/1 | ... |
| ACCUMULATED VALUE OF (RRRR+1) | 3 | 8 | 12 | 19 | 25 | ... |

FIG. 18

| MINIMUM BIT LENGTH M(min) | MAXIMUM BIT LENGTH M(max) |
|---|---|
| 3 | 7 |

FIG. 21

| COLOR COMPONENT DESIGNATION INFORMATION | | | DESIGNATED COLOR COMPONENTS |
|---|---|---|---|
| YE | UE | VE | |
| 0 | 0 | 0 | NONE |
| 0 | 0 | 1 | V ONLY |
| 0 | 1 | 0 | U ONLY |
| 0 | 1 | 1 | U AND V |
| 1 | 0 | 0 | Y ONLY |
| 1 | 0 | 1 | Y AND V |
| 1 | 1 | 0 | Y AND U |
| 1 | 1 | 1 | ALL |

APPARATUS AND METHOD FOR EMBEDDING WATERMARK INFORMATION IN COMPRESSED IMAGE DATA, AND APPARATUS AND METHOD FOR RETRIEVING WATERMARK INFORMATION FROM COMPRESSED IMAGE DATA HAVING WATERMARK INFORMATION EMBEDDED THEREIN

BACKGROUND OF THE INVENTION

1. Field of the Invention

The present invention generally relates to an information embedding apparatus, an information embedding method, an information retrieving apparatus, and an information retrieving method. More specifically, the present invention relates to an apparatus and method for embedding information such as sound information and copyright information (watermark information) in compressed image data, and an apparatus and method for retrieving watermark information from compressed image data having watermark information embedded therein.

2. Description of the Background Art

Recently, the digital watermarking technology is increasingly studied in order to protect the copyrights of the multimedia contents such as images and music. The digital watermarking technology is the technology of confidentially recording (embedding) other information such as copyright information (watermark information) in the multimedia contents such as images and music in order to prevent illegal copying and unauthorized use. Particularly for the image data, there is the technology of embedding sound information as watermark information so that the user can enjoy both image and sound when reproducing the media, in addition to the technology of embedding copyright information for the purpose of regulating such illegal copying and unauthorized use.

Information such as copyright information and sound information (watermark information) is embedded in image data that has already been compressed in a JPEG (Joint Photographic Experts Group) or MPEG (Motion Picture Experts Group) format by using an information embedding apparatus as shown in FIG. 31. This operation is conducted as follows: first, the compressed image data is subjected to variable length decoding operation and run length decoding operation by a variable length decoding section 311 and a run length decoding section 312, respectively, to extract a DCT (Discrete Cosine Transform) coefficient. The DCT coefficient thus extracted is temporarily stored in a coefficient memory 313. An embedding section 314 then embeds watermark information in a bit of the DCT coefficient stored in the coefficient memory 313 based on bit designation information. The DCT coefficient having the watermark information embedded therein is then subjected to run length encoding operation and variable length encoding operation in a run length encoding section 315 and a variable length encoding section 316, respectively. The watermark information is thus embedded in the compressed image data.

As described above, in order to embed watermark information in image data that has already been compressed in a JPEG or MPEG format, the compressed image data is subjected to operations such as variable length decoding, run length decoding, embedding of the watermark information, run length encoding and variable length encoding. However, the information embedding apparatus of FIG. 31 uses a common code table 317 for the variable length encoding operation and the variable length decoding operation, and therefore cannot conduct these operations simultaneously. Accordingly, the DCT coefficient obtained by the variable length decoding operation and the run length decoding operation is temporarily stored in the coefficient memory 313. In this way, the variable length decoding operation of the compressed image data and the variable length encoding operation of the data having the watermark information embedded therein are conducted in a time-sharing manner.

SUMMARY OF THE INVENTION

It is an object of the present invention to provide an information embedding apparatus and a method thereof which are capable of rapidly embedding watermark information in compressed image data.

According to one aspect of the present invention, an apparatus for embedding watermark information in image data compressed by orthogonal transformation, quantization, run length encoding and variable length encoding includes a variable length decoding means, an embedding means, and a connecting means. The variable length decoding means extracts a codeword and an additional bit or bits corresponding to the codeword from the compressed image data based on a code table. The embedding means embeds watermark information in a prescribed bit of the additional bits extracted by the variable length decoding means. The connecting means connects the additional bits having the watermark information embedded therein by the embedding means with the codeword extracted by the variable length decoding means to produce a variable length code.

The above information embedding apparatus extracts a codeword and an additional bit(s) from the compressed image data and embeds watermark information in a prescribed bit of the extracted additional bits. Accordingly, unlike the conventional information embedding apparatus that embeds watermark information in a prescribed bit of a quantized coefficient (e.g., a DCT coefficient), the above information embedding apparatus does not require the run length decoding operation for extracting a quantized coefficient. Moreover, since the watermark information is embedded in the prescribed bit of the additional bits, the codeword and the additional-bit length will not change before and after embedding the watermark information. Accordingly, unlike the conventional information embedding apparatus, the above information embedding apparatus does not require variable length encoding operation after embedding the watermark information.

Since the above information embedding apparatus embeds the watermark information in the prescribed bit of the additional bits, it requires neither run length decoding/encoding operations nor variable length encoding operation. This simplifies the overall structure as compared to the conventional information embedding apparatus.

Moreover, since the variable length encoding operation is not required, the variable length decoding operation of the compressed image data and the variable length encoding operation of the data having the watermark information embedded therein need not be conducted in a time-sharing manner. Accordingly, the above information embedding apparatus is capable of embedding the watermark information in the compressed image data at a higher speed as compared to the conventional apparatus. This enables high-speed processing in the low-frequency operation, allowing for reduced power consumption.

Preferably, the above information embedding apparatus further includes a domain determining means. The domain determining means determines whether the codeword extracted by the variable length decoding means is included in a first frequency domain or not. The embedding means embeds the watermark information in the prescribed bit of the additional bits corresponding to the codeword determined as being included in the first frequency domain by the domain determining means.

The image having watermark information embedded therein normally has degraded quality as compared to the original image. However, the human eyes are sensitive to a change in low frequency components, but insensitive to a change in high frequency components.

The above information embedding apparatus is capable of embedding the watermark information in the additional bits corresponding to the codeword included in the first frequency domain. Accordingly, in order to prevent degradation in image quality resulting from embedding of the watermark information from being perceived, a relatively high frequency domain is applied as the first frequency domain. In contrast, for the image that cannot be viewed until license fee is paid, the watermark information is intentionally presented to the unauthorized user in a visual form. In this case, a relatively low frequency domain is applied as the first frequency domain. In this way, the watermark information can be embedded in an appropriate frequency domain according to applications and purposes.

Preferably, the above information embedding apparatus further includes a bit length determining means. The bit length determining means determines whether the additional bits extracted by the variable length decoding means have a prescribed bit length or not. The embedding means embeds the watermark information in the prescribed bit of the additional bits determined as having the prescribed bit length by the bit length determining means.

The number of codewords included in the compressed image data varies between individual images. If a relatively large amount of data is to be embedded as the watermark information, the watermark information must be embedded in the additional bits corresponding to all the codewords included in the compressed image data. However, if a relatively small amount of data is to be embedded as the watermark information, the watermark information need not necessarily be embedded in the additional bits corresponding to all the codewords. In other words, the watermark information need only be embedded in the additional bit(s) corresponding to one or more of the codewords. Degradation in image quality is less likely to be perceived when the watermark information is embedded only in the additional bit(s) corresponding to a less frequently occurring codeword (i.e., a codeword that is included in the compressed image data at a lower rate) than when the watermark information is embedded only in the additional bit(s) corresponding to a frequently occurring codeword (i.e., a codeword that is included in the compressed image data at a higher rate).

Normally, a quantized coefficient having a greater value occurs less frequently. Moreover, a greater group number is assigned to a greater quantized coefficient (i.e., a less frequently occurring quantized coefficient). Moreover, a greater additional-bit length is assigned to a greater group number. Accordingly, a greater additional-bit length is assigned to a less frequently occurring quantized coefficient. Moreover, a greater codeword length (code length) is assigned to a greater group number. In other words, a less frequently occurring codeword (i.e., a codeword that is included in the compressed image data at a lower rate) corresponds to a greater group number and a greater additional-bit length.

The above information embedding apparatus embeds the watermark information in the additional bits having a prescribed bit length. Accordingly, when a relatively small amount of data is to be embedded as the watermark information, the watermark information is embedded in the additional bits having a relatively long bit length (i.e., less frequently occurring bits). In this case, the locations where the watermark information is embedded are dispersed on the screen. As a result, degradation in image quality is less likely to be perceived. In this way, the watermark information can be embedded in the additional bits having an appropriate bit length according to applications and purposes.

Preferably, the above information embedding apparatus further includes a color component determining means. The color component determining means determines whether a color component of the codeword extracted by the variable length decoding means is a prescribed color component or not. The embedding means embeds the watermark information in the prescribed bit of the additional bits corresponding to the codeword determined as being the prescribed color component by the color component determining means.

Normally, the image having the watermark information embedded therein has degraded quality as compared to the original image. However, the human eyes are sensitive to a change in luminance component, but insensitive to a change in chrominance component.

The above information embedding apparatus is capable of embedding watermark information in the additional bit(s) corresponding to the codeword of the prescribed color component. For example, in order to prevent degradation in image quality resulting from embedding of the watermark information from being perceived, watermark information is embedded in the additional bit(s) corresponding to the codeword of the chrominance component. This suppresses the influence of degradation in image quality. In this way, the watermark information can be embedded in the additional bit(s) corresponding to the codeword of an appropriate color component according to applications and purposes.

Preferably, the variable length decoding means further extracts a codeword from the compressed image data based on the code table as preprocessing of the extracting operation. The above information embedding apparatus further includes a codeword counter. The codeword counter counts the number of codewords extracted by the variable length decoding means as the preprocessing.

In the above information embedding apparatus, the variable length decoding means first sequentially extracts the codewords from the compressed image data as the preprocessing. The codeword counter then counts the number of extracted codewords. This makes it possible to know the number of codewords included in the compressed image data in advance.

Preferably, the above information embedding apparatus further includes a bit designating means. The bit designating means designates the prescribed bit for embedding the watermark information, based on the number of codewords counted by the codeword counter.

The above information embedding apparatus designates the prescribed bit for embedding the watermark information based on the number of codewords counted by the codeword counter, and embeds the watermark information in the designated bit. This prevents the embedding operation from being conducted again. Moreover, this enables the watermark information to be embedded uniformly so as to prevent degradation in image quality from being perceived as much as possible.

Preferably, the variable length decoding means further extracts a codeword from the compressed image data based on the code table as preprocessing of the extracting operation. The domain determining means further determines whether the codeword extracted by the variable length decoding means in the preprocessing is included in a second frequency domain or not. The above information embedding apparatus further includes a domain codeword counter. The domain codeword counter counts the number of codewords determined as being included in the second frequency domain by the domain determining means.

In the above information embedding apparatus, the variable length decoding means first sequentially extracts the codewords from the compressed image data as the preprocessing. The domain determining means then determines whether the codeword extracted in the preprocessing is included in the second frequency domain or not. The domain codeword counter thus counts the number of codewords determined as being included in the second frequency domain. This makes it possible to know in advance the number of codewords included in the second frequency domain out of the codewords included in the compressed image data.

Preferably, the above information embedding apparatus further includes a frequency domain designating means. The frequency domain designating means designates the first frequency domain based on the number of codewords counted by the domain codeword counter.

The above information embedding apparatus designates the first frequency domain based on the number of codewords counted by the domain codeword counter, and embeds the watermark information in the prescribed bit of the additional bit(s) corresponding to the codeword included in the designated first frequency domain. This prevents the embedding operation from being conducted again.

Preferably, the above information embedding apparatus further includes a header information producing means and a multiplexing means. The header information producing means produces header information that indicates which of the additional bits has the watermark information embedded therein. The multiplexing means multiplexes the header information produced by the header information producing means with the variable length code produced by the connecting means.

The above information embedding apparatus multiplexes the header information that indicates which of the additional bits has the watermark information embedded therein. Accordingly, when the image is restored, the embedded watermark information can be correctly retrieved by analyzing the header information.

Preferably, the above information embedding apparatus further includes a header information producing means and a multiplexing means. The header information producing means produces header information that indicates a frequency domain of the additional bit having the watermark information embedded therein by the embedding means. The multiplexing means multiplexes the header information produced by the header information producing means with the variable length code produced by the connecting means.

The above information embedding apparatus multiplexes the header information that indicates a frequency domain of the additional bit having the watermark information embedded therein. Accordingly, when the image is restored, the embedded watermark information can be correctly retrieved by analyzing the header information.

According to another aspect of the present invention, an apparatus for retrieving watermark information from compressed image data having watermark information embedded therein by the above information embedding apparatus includes an analyzing means, a variable length decoding means, and a retrieving means. The analyzing means recognizes the prescribed bit having the watermark information embedded therein, based on the header information. The variable length decoding means extracts an additional bit or bits from the compressed image data based on a code table. The retrieving means retrieves data of the prescribed bit recognized by the analyzing means from the additional bits extracted by the variable length decoding means.

The above information retrieving apparatus retrieves watermark information from the compressed image data having the watermark information embedded by the above information embedding apparatus. This compressed image data has header information multiplexed therein. The header information indicates which of the additional bits has the watermark information embedded therein. The bit having the watermark information embedded therein is recognized based on the header information. The data of the recognized bit is then retrieved from the additional bits extracted by the variable length decoding means. In this way, the above information retrieving apparatus recognizes the prescribed bit having the watermark information embedded therein based on the header information, and retrieves the data of the recognized prescribed bit from the additional bits extracted by the variable length decoding means. This enables the embedded watermark information to be retrieved correctly.

According to still another aspect of the present invention, an apparatus for retrieving watermark information from compressed image data having watermark information embedded therein by the above information embedding apparatus includes an analyzing means, a variable length decoding means, and a retrieving means. The analyzing means recognizes a frequency domain of an additional bit having the watermark information embedded therein, based on the header information. The variable length decoding means extracts an additional bit or bits from the compressed image data based on a code table. The retrieving means retrieves data of the prescribed bit of the additional bits extracted by the variable length decoding means when the extracted additional bits are included in the frequency domain recognized by the analyzing means.

The above information retrieving apparatus retrieves watermark information from the compressed image data having the watermark information embedded by the above information embedding apparatus. This compressed image data has header information multiplexed therein. The header information indicates a frequency domain of an additional bit having the watermark information embedded therein. The frequency domain of the additional bit having the watermark information embedded therein is recognized based on the header information. Of the additional bits extracted by the variable length decoding means, the data of the prescribed bit of the additional bits included in the recognized frequency domain is then retrieved. In this way, the above information retrieving apparatus recognizes the frequency domain of the additional bits having the watermark information embedded therein based on the header information. Thereafter, of the additional bits extracted by the variable length decoding means, the above information retrieving apparatus retrieves the data of the prescribed bit of the additional bits included in the recognized frequency domain. This enables the embedded watermark information to be retrieved correctly.

According to yet another aspect of the present invention, a method for embedding watermark information in image data compressed by orthogonal transformation, quantization, run length encoding and variable length encoding includes an extracting step, an embedding step, and a connecting step. In the extracting step, a codeword and an additional bit or bits corresponding to the codeword are extracted from the compressed image data based on a code table. In the embedding step, watermark information is embedded in a prescribed bit of the additional bits extracted by the extracting step. In the connecting step, the additional bits having the watermark information embedded therein by the embedding step are connected with the codeword extracted by the extracting step to produce a variable length code.

In the above information embedding method, the watermark information is embedded in the prescribed bit of the additional bits, eliminating the need for run length decoding/encoding operations and variable length encoding operation. This simplifies the overall operation as compared to the conventional information embedding method.

As described above, the variable length encoding operation is not required in the above information embedding method. Therefore, unlike the conventional information embedding method, the variable length decoding operation of the compressed image data and the variable length encoding operation of the data having the watermark information embedded therein need not be conducted in a time-sharing manner. Accordingly, the above information embedding method is capable of embedding the watermark information in the compressed image data at a higher speed as compared to the conventional method.

Preferably, the compressed image data having the watermark information embedded therein by the above information embedding method is restored, and the extracting step, the embedding step and the connecting step are conducted again with a reduced number of prescribed bits according to a degree of degradation in quality of the restored image. This suppresses degradation in quality of the compressed image having the watermark information embedded therein.

Preferably, when part of the watermark information to be embedded fails to be embedded in the above information embedding method, the extracting step, the embedding step and the connecting step are conducted again with an increased number of prescribed bits. This enables all the watermark information to be embedded reliably.

Preferably, the above information embedding method further includes the step of determining whether the codeword extracted by the extracting step is included in the first frequency domain or not. In the embedding step, the watermark information is embedded in the prescribed bit of the additional bits corresponding to the codeword determined as being included in the first frequency domain by the determining step.

The image having watermark information embedded therein normally has degraded quality as compared to the original image. However, the human eyes are sensitive to a change in low frequency components, but insensitive to a change in high frequency components.

The above information embedding method is capable of embedding the watermark information in the additional bits corresponding to the codeword included in the first frequency domain. Accordingly, in order to prevent degradation in image quality resulting from embedding of the watermark information from being perceived, a relatively high frequency domain is applied as the first frequency domain. In contrast, for the image that cannot be viewed until license fee is paid, the watermark information is intentionally presented to the unauthorized user in a visual form. In this case, a relatively low frequency domain is applied as the first frequency domain. In this way, the watermark information can be embedded in an appropriate frequency domain according to applications and purposes.

Preferably, the compressed image data having the watermark information embedded therein by the above information embedding method is restored, and the extracting step, the embedding step and the connecting step are conducted again with a reduced first frequency domain according to a degree of degradation in quality of the restored image. This suppresses degradation in quality of the compressed image having the watermark information embedded therein.

Preferably, when part of the watermark information to be embedded fails to be embedded in the above information embedding method, the extracting step, the embedding step and the connecting step are conducted again with an increased first frequency domain. This enables all the watermark information to be embedded reliably.

Preferably, the above information embedding method further includes the step of determining whether the additional bits extracted by the extracting step have a prescribed bit length or not. In the embedding step, the watermark information is embedded in the prescribed bit of the additional bits determined as having the prescribed bit length by the determining step.

The number of codewords included in the compressed image data varies between individual images. If a relatively large amount of data is to be embedded as the watermark information, the watermark information must be embedded in the additional bits corresponding to all the codewords included in the compressed image data. However, if a relatively small amount of data is to be embedded as the watermark information, the watermark information need not necessarily be embedded in the additional bits corresponding to all the codewords. In other words, the watermark information need only be embedded in the additional bit(s) corresponding to one or more of the codewords. Degradation in image quality is less likely to be perceived when the watermark information is embedded only in the additional bit(s) corresponding to a less frequently occurring codeword (i.e., a codeword that is included in the compressed image data at a lower rate) than when the watermark information is embedded only in the additional bit(s) corresponding to a frequently occurring codeword (i.e., a codeword that is included in the compressed image data at a higher rate).

Normally, a quantized coefficient having a greater value occurs less frequently. Moreover, a greater group number is assigned to a greater quantized coefficient (i.e., a less frequently occurring quantized coefficient). Moreover, a greater additional-bit length is assigned to a greater group number. Accordingly, a greater additional-bit length is assigned to a less frequently occurring quantized coefficient. Moreover, a greater codeword length (code length) is assigned to a greater group number. In other words, a less frequently occurring codeword (i.e., a codeword that is included in the compressed image data at a lower rate) corresponds to a greater group number and a greater additional-bit length.

In the above information embedding method, the watermark information is embedded in the additional bits having a prescribed bit length. Accordingly, when a relatively small amount of data is to be embedded as the watermark information, the watermark information is embedded in the additional bits having a relatively long bit length (i.e., less frequently occurring bits). In this case, the locations where the watermark information is embedded are dispersed on the screen. As a result, degradation in image quality is less likely to be perceived. In this way, the watermark information can be embedded in the additional bits having an appropriate bit length according to applications and purposes.

Preferably, the compressed image data having the watermark information embedded therein by the above information embedding method is restored, and the extracting step, the embedding step and the connecting step are conducted again with a reduced range of the prescribed bit length according to a degree of degradation in quality of the restored image. This suppresses degradation in quality of the compressed image having the watermark information embedded therein.

Preferably, when part of the watermark information to be embedded fails to be embedded in the above information embedding method, the extracting step, the embedding step and the connecting step are conducted again with an increased range of the prescribed bit length. This enables all the watermark information to be embedded reliably.

Preferably, the above information embedding method further includes the step of determining whether a color component of the codeword extracted by the extracting step is a prescribed color component or not. In the embedding step, the watermark information is embedded in the prescribed bit of the additional bits corresponding to the codeword determined as being the prescribed color component by the determining step.

Normally, the image having the watermark information embedded therein has degraded quality as compared to the original image. However, the human eyes are sensitive to a change in luminance component, but insensitive to a change in chrominance component.

The above information embedding method is capable of embedding watermark information in the additional bit(s) corresponding to the codeword of the prescribed color component. For example, in order to prevent degradation in image quality resulting from embedding of the watermark information from being perceived, watermark information is embedded in the additional bit(s) corresponding to the codeword of the chrominance component. This suppresses the influence of degradation in image quality. In this way, the watermark information can be embedded in the additional bit(s) corresponding to the codeword of an appropriate color component according to applications and purposes.

Preferably, the compressed image data having the watermark information embedded therein by the above information embedding method is restored, and the extracting step, the embedding step and the connecting step are conducted again with a different prescribed color component according to a degree of degradation in quality of the restored image. This suppresses degradation in quality of the compressed image having the watermark information embedded therein.

Preferably, preprocessing of the extracting step includes the steps of extracting a codeword from the compressed image data based on the code table, and counting the number of extracted codewords.

The above information embedding method makes it possible to know the number of codewords included in the compressed image data in advance.

Preferably, the preprocessing further includes the step of designating the prescribed bit for embedding the watermark information, based on the number of codewords counted by the counting step.

In the above information embedding method, the prescribed bit for embedding the watermark information is designated based on the number of codewords, and the watermark information is embedded in the designated bit. This prevents the embedding operation from being conducted again. Moreover, this enables the watermark information to be embedded uniformly so as to prevent degradation in image quality from being perceived as much as possible.

Preferably, preprocessing of the extracting step includes the steps of extracting a codeword from the compressed image data based on the code table, determining whether the extracted codeword is included in a second frequency domain or not, and counting the number of codewords determined as being included in the second frequency domain.

The above information embedding method makes it possible to know in advance the number of codewords included in the second frequency domain out of the codewords included in the compressed image data.

Preferably, the preprocessing further includes the step of designating the first frequency domain based on the number of codewords counted by the counting step.

In the above information embedding method, the first frequency domain is designated based on the number of codewords counted by the counting step, and the watermark information is embedded in the prescribed bit of the additional bit(s) corresponding to the codeword included in the designated first frequency domain. This prevents the embedding operation from being conducted again.

Preferably, the above information embedding method further includes a multiplexing step. In the multiplexing step, header information is multiplexed with the variable length code produced by the connecting step. The header information indicates which of the additional bits has the watermark information embedded therein.

In the above information embedding method, the header information that indicates which of the additional bits has the watermark information embedded therein is multiplexed. Accordingly, when the image is restored, the embedded watermark information can be correctly retrieved by analyzing the header information.

Preferably, the above information embedding method further includes a multiplexing step. In the multiplexing step, header information is multiplexed with the variable length code produced by the connecting step. The header information indicates a frequency domain of the additional bit having the watermark information embedded therein by the embedding step.

In the above information embedding method, the header information that indicates a frequency domain of the additional bit having the watermark information embedded therein is multiplexed. Accordingly, when the image is restored, the embedded watermark information can be correctly retrieved by analyzing the header information.

According to a further aspect of the present invention, a method for retrieving watermark information from compressed image data having watermark information embedded therein by the above information embedding method includes a recognizing step, an extracting step and a retrieving step. In the recognizing step, the prescribed bit having the watermark information embedded therein is recognized based on the header information. In the extracting step, an additional bit or bits are extracted from the compressed image data based on a code table. In the retrieving step, data of the prescribed bit recognized by the recognizing step is retrieved from the additional bits extracted by the extracting step.

In the above information retrieving method, the watermark information is retrieved from the compressed image data having the watermark information embedded therein by the above information embedding method. This compressed image data has header information multiplexed therein. The header information indicates which of the additional bits has the watermark information embedded therein. The bit having the watermark information embedded therein is recognized based on the header information. The data of the recognized bit is then retrieved from the additional bits extracted by the extracting step. In this way, in the above information retrieving method, the prescribed bit having the watermark information embedded therein is recognized based on the header information, and the data of the recognized prescribed bit is retrieved from the additional bits extracted by the extracting step. This enables the embedded watermark information to be retrieved correctly.

According to a still further aspect of the present invention, a method for retrieving watermark information from compressed image data having watermark information embedded therein by the above information embedding method includes a recognizing step, an extracting step and a retrieving step. In the recognizing step, a frequency domain of an additional bit having the watermark information embedded therein is recognized based on the header information. In the extracting step, an additional bit or bits are extracted from the compressed image data based on a code table. In the retrieving step, data of the prescribed bit of the additional bits extracted by the extracting step is retrieved when the extracted additional bits are included in the frequency domain recognized by the recognizing step.

In the above information retrieving method, watermark information is retrieved from the compressed image data having the watermark information embedded by the above information embedding method. This compressed image data has header information multiplexed therein. The header information indicates a frequency domain of an additional bit having the watermark information embedded therein. The frequency domain of the additional bit having the watermark information embedded therein is recognized based on the header information. Of the additional bits extracted by the extracting step, the data of the prescribed bit of the additional bits included in the recognized frequency domain is then retrieved. In this way, in the above information retrieving method, the frequency domain of the additional bits having the watermark information embedded therein is recognized based on the header information. Thereafter, of the additional bits extracted by the extracting step, the data of the prescribed bit of the additional bits included in the recognized frequency domain is retrieved. This enables the embedded watermark information to be retrieved correctly.

BRIEF DESCRIPTION OF THE DRAWINGS

FIG. 4 shows the correspondence between an effective coefficient, a group number, and the number of additional bits;

FIG. 5 shows the correspondence between additional bits and an effective coefficient in a group of group No. 4;

FIG. 6 shows an example of a code table showing the correspondence between a run/group number and a codeword;

FIG. 18 shows an example of additional-bit length designation information;

FIG. 21 shows an example of color component designation information;

DESCRIPTION OF THE PREFERRED EMBODIMENTS

Figure 1:
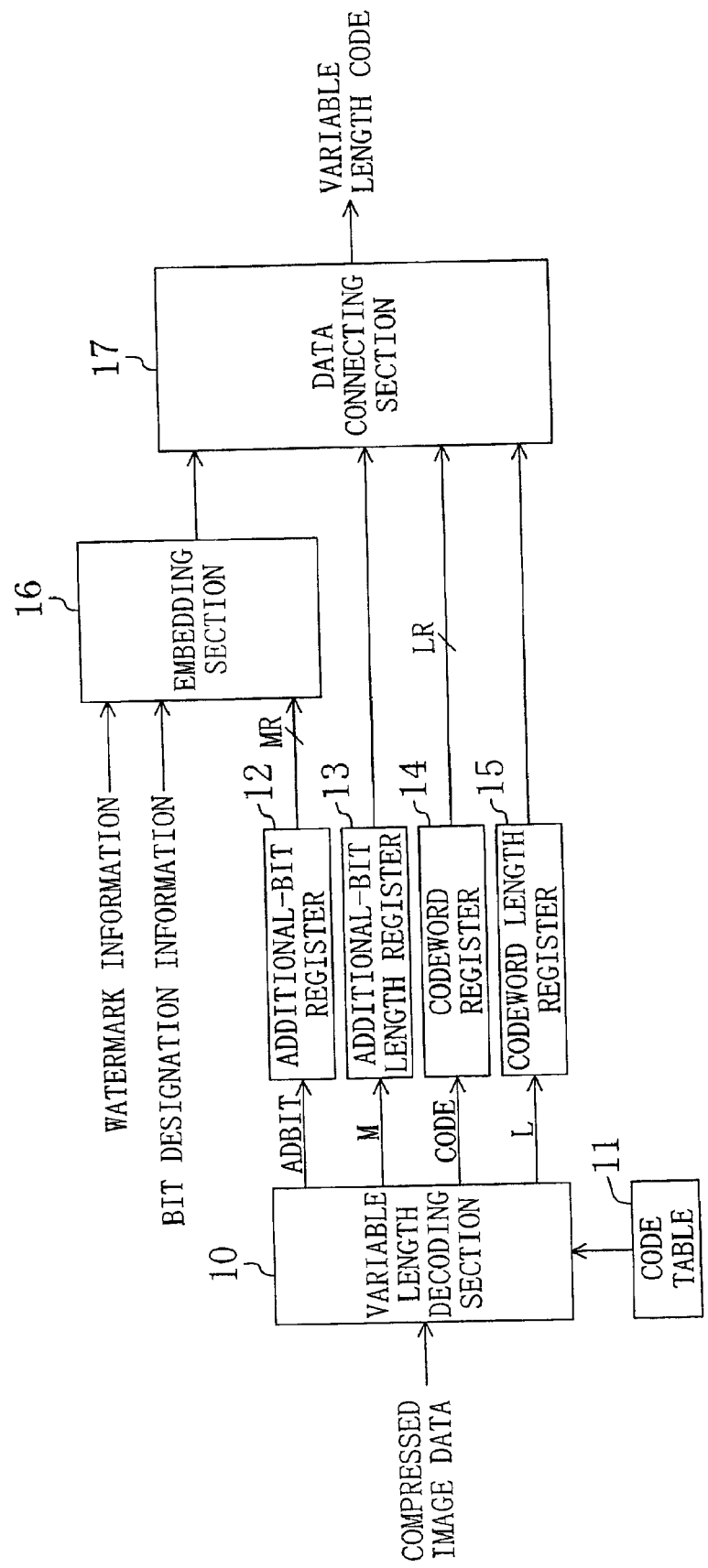
FIG. 1 is a block diagram showing the overall structure of an information embedding apparatus according to a first embodiment of the present invention.

Hereinafter, embodiments of the present invention will be described in detail in conjunction with the accompanying drawings. Note that the same or corresponding portions are denoted with the same reference numerals and characters throughout the figures, and description thereof will not be repeated.

(First Embodiment)
[Overall Structure]

FIG. 1 is a block diagram showing the overall structure of an information embedding apparatus according to the first embodiment of the present invention. The information embedding apparatus of FIG. 1 is an apparatus for embedding information such as copyright information and sound information (watermark information) in compressed image data. The information embedding apparatus includes a variable length decoding section 10, a code table 11, an additional-bit register 12, an additional-bit length register 13, a codeword register 14, a codeword length register 15, an embedding section 16, and a data connecting section 17.

The variable length decoding section 10 extracts a codeword CODE and additional bits ADBIT corresponding to the codeword CODE from the compressed image data with reference to the code table 11. The variable length decoding section 10 also outputs a codeword length L and an additional-bit length M. The codeword length L indicates the length of the codeword CODE, and the additional-bit length M indicates the length of the additional bits ADBIT. The code table 11 indicates the correspondence between a run/group number combination and a codeword. The additional-bit register 12 is an MR-bit register that temporarily stores the additional bits ADBIT extracted by the variable length decoding section 10. The additional-bit length register 13 temporarily stores the additional-bit length M from the variable length decoding section 10. The codeword register 14 is an LR-bit register that temporarily stores the codeword CODE extracted by the variable length decoding section 10. The codeword length register 15 temporarily stores the codeword length L from the variable length decoding section 10. The embedding section 16 embeds watermark information in a bit(s) of the additional bits stored in the additional-bit register 12 according to bit designation information. The data connecting section 17 connects the additional bits having the watermark information embedded therein with the codeword from the codeword register 14 to produce a variable length code.

[Compressed Image Data]

Figures 2, 3:
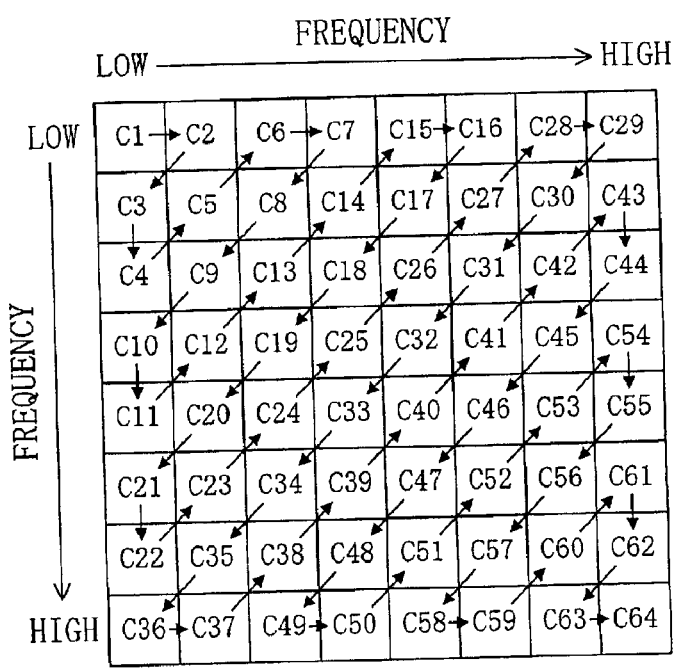
FIG. 2 shows an original image divided into a plurality of blocks.
FIG. 3 shows DCT coefficients obtained by two-dimensional DCT.

Hereinafter, compressed image data in which watermark information is to be embedded by the information embedding apparatus of FIG. 1 will be described. This compressed image data is the image data compressed in a JPEG format. The original image is compressed as follows:

(1) First, as shown in FIG. 2, the original image data is divided into a plurality of blocks BK00 to BKhv. Each block BKhv (where h, v is a positive integer) is formed from 8-by-8 pixels. Each block BKhv is subjected to the following operations (2) to (6).

(2) Color space transformation

Color components of the image data in the block BKhv are transformed from three-primary-color components (R, G, B) into a luminance component and chrominance components (Y, U, V).

(3) DCT (Discrete Cosine Transform)

After the color space transformation, the resultant image data in the block BKhv is subjected to two-dimensional DCT. As a result, DCT coefficients C1 to C64 are obtained as shown in FIG. 3.

(4) Quantization

The DCT coefficients C1 to C64 are quantized based on the step size of a quantization table (not shown).

(5) Run Length Encoding

The DCT coefficients thus quantized are run-lengthen-coded in order of zigzag scan (in order of frequency), that is, from the DCT coefficient C1 to the DCT coefficient C64 as shown in the arrows in FIG. 3. The run length encoding operation is conducted as follows: first, the quantized DCT coefficients are encoded into a run indicating the number of successive coefficients equal to zero, and the following non-zero coefficient (effective coefficient). Thereafter, a group number and an additional bit(s) are assigned to the effective coefficients. FIG. 4 shows the correspondence between the effective coefficient, the group number and the number of additional bits. The effective coefficients Dq are grouped as shown in FIG. 4. Group No. SSSS indicates the group of the effective coefficients Dq. An additional bit(s) is assigned to each group in order to specify each effective coefficient in that group. The number of additional bits assigned to each group is equal to the group number of that group.

For example, as shown in FIG. 4, the effective coefficient Dq having a value "+8" belongs to a group of group No. 4. Accordingly, "4" is assigned as group No. SSSS of that effective coefficient Dq. Since the group of group No. 4 includes sixteen effective coefficients Dq. Therefore, four additional bits are required in order to specify each effective coefficient in the same group (SSSS=4). As shown in FIG. 5, the additional-bit values "0000", "0001", . . . , "1111" are respectively assigned to the effective coefficients in the same group (SSSS=4) in ascending order (i.e., from −15 to +15). The effective coefficient Dq having a value "+8" is the ninth smallest coefficient in the group of group No. 4. Accordingly, an additional-bit value "1000" is assigned thereto.

(6) Variable Length Encoding

Codewords are respectively assigned to run/group number combinations based on the code table as shown in FIG. 6. The additional bit(s) is connected right after the assigned codeword to produce a variable length code.

For example, provided that the run/group number combination is 2/4 and the additional bits are "1100", a 12-bit codeword "111111110100" is assigned as shown in FIG. 6. The additional bits "1100" are connected right after the 12-bit codeword to produce a 16-bit variable length code "1111111101001100".

Every block BKhv is subjected to the above operations (2) to (6). The compressed image data is thus produced.

[Operation of Embedding Watermark Information]

Hereinafter, operation of embedding watermark information by the information embedding apparatus of FIG. 1 will be described with reference to the flowchart of FIG. 7.

Figure 8:
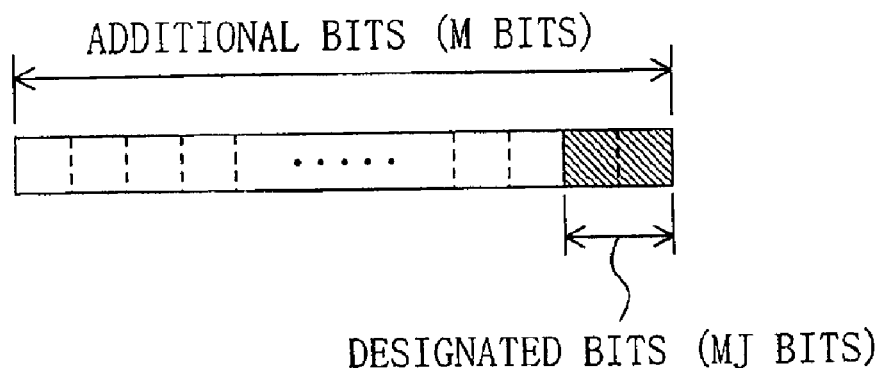
FIG. 8 shows an example in which the lower two of the additional bits are designated for embedding watermark information.

First, in step ST701, bit designation information is applied to the embedding section 16. The bit designation information designates one or more bits (MJ bits) of the M additional bits as bits for embedding the watermark information. FIG. 8 shows an example in which the lower two of the additional bits ADBIT are designated for embedding the watermark information. The bit position and the number of bits are not limited to this, and any bit position and any number of bits can be designated. However, it should be noted that, if an upper bit(s) or a plurality of lower bits are designated, embedding the watermark information therein would significantly vary the additional-bit value. This results in significant degradation in quality of the restored (decompressed) image.

Thereafter, in step ST702, variable length codes included in the image data compressed in a JPEG format are sequentially applied to the variable length decoding section 10. It is now assumed that the variable length codes as shown in FIG. 9 are applied.

In step ST703, the variable length decoding section 10 extracts a codeword CODE and an additional bit(s) ADBIT following the codeword CODE with reference to the code table 11 shown in FIG. 6. The variable length decoding section 10 outputs the bit length (codeword length) L of the extracted codeword CODE and the bit length (additional-bit length) M of the extracted additional bits ADBIT. The codeword CODE and the additional bits ADBIT extracted by the variable length decoding section 10 are temporarily stored in the codeword register 14 and the additional-bit register 12, respectively. The codeword register 14 is an LR-bit register, and the additional-bit register 12 is an MR-bit register. The codeword length L is temporarily stored in the codeword length register 15. The additional-bit length M is temporarily stored in the additional-bit length register 13. It is herein assumed that the bit width LR of the codeword register 14 is 16 (=the maximum codeword length), and the bit width MR of the additional-bit register 12 is 12 (=the maximum additional-bit length).

Hereinafter, operation in step ST703 will be specifically described for the variable length code (16 bits) shown in FIG. 9.

Figure 9:
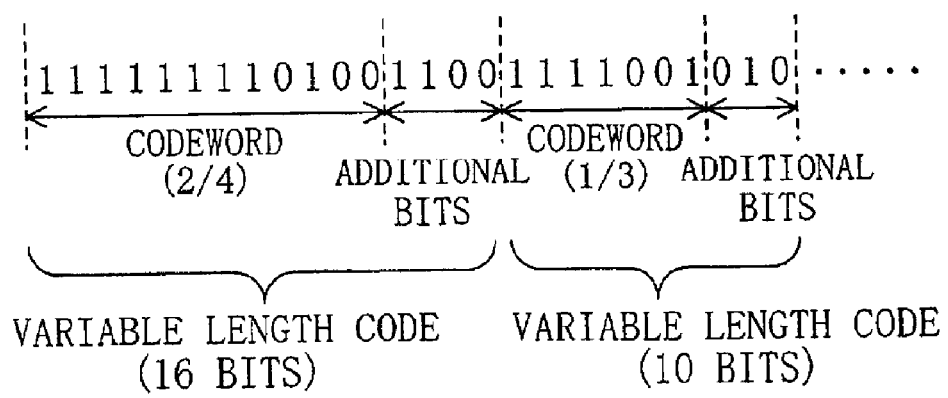
FIG. 9 shows an example of variable length codes that are sequentially applied to a variable length decoding section.

In FIG. 9, the first bit string "111111110100" matches the bit string of the codeword corresponding to run/group number=²⁄₄ in the code table 12 of FIG. 6. Accordingly, "111111110100" (12 bits) is extracted as codeword CODE. The codeword CODE thus extracted is extended to a 16-bit string "0000111111110100" before being stored in the codeword register 14. In other words, the values "0" are stored in the upper four bits of the 16-bit codeword register 14. Although the codeword CODE is herein extended with the values "0", any value may be used to extend the codeword CODE. Alternatively, only the 12-bit codeword "111111110100" may be stored in the 16-bit codeword register. In other words, nothing may be stored in the upper four bits of the 16-bit codeword register 14.

Since the codeword length L is 12 bits, the value "12" is stored in the codeword length register 15. Since the group number SSSS of the extracted codeword CODE is four, the number of additional bits for this codeword CODE is four (see FIG. 4). Accordingly, the four bits "1100" right after the codeword "111111110100" are extracted as additional bits ADBIT. The additional bits ADBIT thus extracted are extended to a 12-bit string "000000001100" before being stored in the additional-bit register 12. In other words, the values "0" are stored in the upper eight bits of the 12-bit additional-bit register 12. Note that, like the codeword register 14, any value may be stored in the remaining upper bits of the additional-bit register 12. Alternatively, nothing may be stored in these upper bits. Since the additional bits ADBIT are "1100", the value "4" is stored in the additional-bit length register 13.

In this way, the following result is obtained:
Codeword CODE="0000111111110100";
Additional bits ADBIT="000000001100";
Codeword length L=12; and
Additional-bit length M=4.

Thereafter, in step ST704, the embedding section 16 embeds watermark information in the output of the 12-bit (MR-bit) additional-bit register 12 according to the bit designation information. The watermark information is copyright information, sound information and the like. For example, when the lower two bits are designated for embedding the watermark information as shown in FIG. 8, 2-bit watermark information is embedded in the lower two bits of the output "000000001100" of the 12-bit additional-bit register 12. In other words, the lower two of the additional bits are replaced with the 2-bit watermark information. Provided that the watermark information to be embedded is "11", the resultant additional-bit value is "000000001111".

Figure 10:
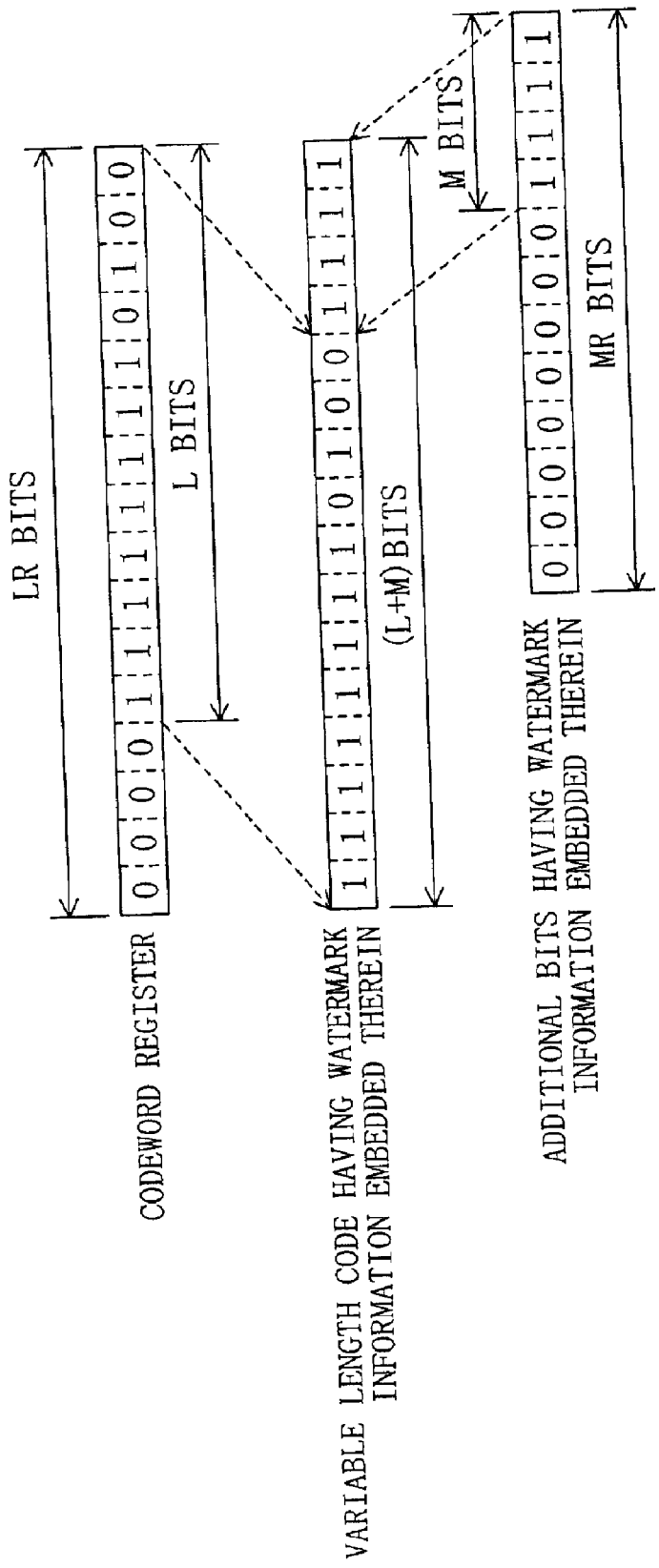
FIG. 10 illustrates operation of connecting a codeword with additional bits.

In step ST705, the data connecting section 17 connects the additional bits from the embedding section 16 with the codeword from the codeword register 14. Hereinafter, this operation will be described specifically. First, as shown in FIG. 10, the bit string "111111110100" designated by the value L (in this example, 12) of the codeword length register 15 is extracted from the lower bits of the LR-bit (in this example, 16-bit) codeword "0000111111110100". Moreover, the bit string "1111" designated by the value M (in this example, 4) of the additional-bit length register 13 is extracted from the lower bits of the MR (in this example, 12) additional bits "000000001111" having the watermark embedded therein. The M additional bits (i.e., the bit string "1111") are connected right after the L-bit codeword (i.e., the bit string "111111110100"). The variable length code "1111111101001111" is thus produced.

As has been described above, a variable length code having watermark information embedded therein is produced by replacing an additional bit(s) designated by the bit designation information with the watermark information. Every variable length code included in the compressed image data is subjected to steps ST703 to ST705. In this way, compressed image data having watermark information embedded therein is obtained.

Thereafter, in step ST706, the compressed image having the watermark information embedded therein is restored (decompressed).

In step ST707, quality of the restored image is evaluated. If the image quality is not acceptable (NG in step ST707), the process returns to step ST701. In this case, bit designation information designating a reduced number of bits for embedding the watermark information is applied to the embedding section 16. Thereafter, steps ST702 to ST706 are conducted again.

If the image quality is acceptable (OK in step ST707), the process proceeds to step ST708. In step ST708, whether the watermark information to be embedded has been completely embedded or not is determined. If YES in step ST708, the process is completed. If NO in step ST708 (i.e., if it is determined that part of the watermark information has not been embedded), the process returns to step S701. In this case, bit designation information designating an increased number of bits for embedding the watermark information is applied to the embedding section 16. Thereafter, steps ST702 to ST707 are conducted again.

[Effects]

The information embedding apparatus of the first embodiment extracts additional bits ADBIT from the compressed image data, and embeds the watermark information in one or more bits of the extracted additional bits ADBIT according to the bit designation information. Accordingly, unlike the conventional information embedding apparatus that embeds watermark information in a prescribed bit of a quantized coefficient (e.g., DCT coefficient), the information embedding apparatus of the first embodiment does not require the run-length decoding operation for extracting a quantized coefficient. Moreover, since the watermark information is embedded in one or more bits of the additional bits ADBIT according to the bit designation information, the codeword and the additional-bit length will not change before and after embedding the watermark information. Accordingly, unlike the conventional information embedding apparatus, the information embedding apparatus of the first embodiment requires neither run length encoding operation nor variable length encoding operation after embedding the watermark information.

As described above, since the information embedding apparatus of the first embodiment embeds the watermark information in a prescribed bit(s) of the additional bits, it requires neither run-length decoding/encoding operations nor variable length encoding operation. This simplifies the overall structure as compared to the conventional information embedding apparatus.

Moreover, since the variable length encoding operation is not required, the variable length decoding operation of the compressed image data and the variable length encoding operation of the data having the watermark information embedded therein need not be conducted in a time-sharing manner. Accordingly, the information embedding apparatus of the first embodiment is capable of embedding the watermark information in the compressed image data at a higher speed as compared to the conventional apparatus. This enables high-speed processing in the low-frequency operation, allowing for reduced power consumption.

Moreover, the compressed image having the watermark information embedded therein is restored, and the quality of the restored image is evaluated (step ST707). If the quality is not acceptable, the embedding operation is conducted again with a reduced number of bits designated for embedding the watermark information. This suppresses degradation in quality of the compressed image having the watermark information embedded therein.

Moreover, whether the watermark information to be embedded has been completely embedded or not is determined (step ST708). If part of the watermark information has not been embedded, the embedding operation is conducted again with an increased number of bits designated for embedding the watermark information. This enables all the embedding information to be embedded reliably.

Although the watermark information is herein embedded in the image data compressed in a JPEG format, the same effects can be obtained even when the watermark information is embedded in the image data compressed in an MPEG format.

Moreover, the information embedding apparatus of the first embodiment does not necessarily require hardware configuration, but may be implemented by software.

(Second Embodiment)

[Overall Structure]

Figure 11:
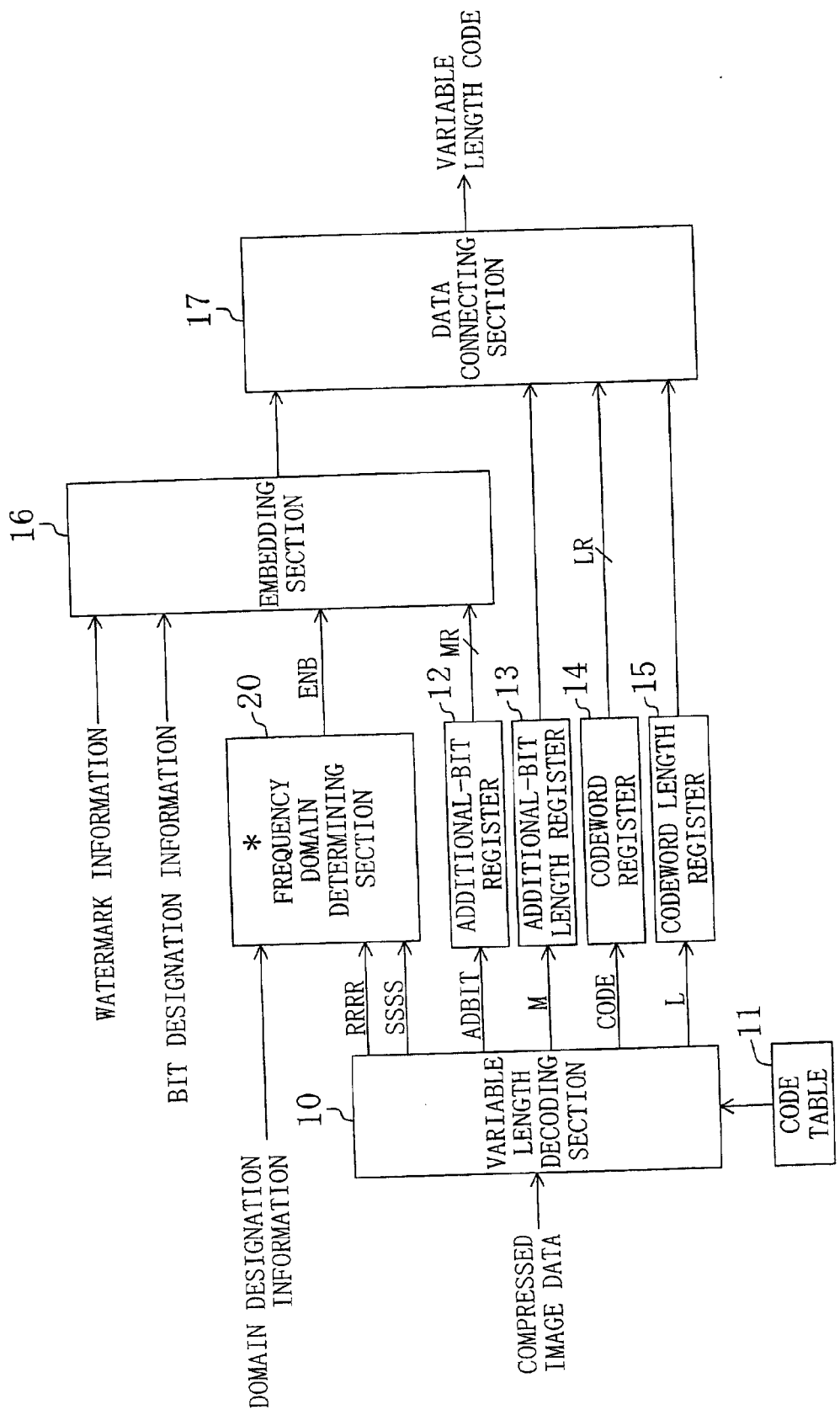
FIG. 11 is a block diagram showing the overall structure of an information embedding apparatus according to a second embodiment of the present invention.

FIG. 11 is a block diagram showing the overall structure of an information embedding apparatus according to the second embodiment of the present invention. Referring to FIG. 11, this information embedding apparatus further includes a frequency domain determining section 20 in addition to the components of the information embedding apparatus of FIG. 1. The frequency domain determining section 20 outputs an active enable signal ENB to the embedding section 16 when the codeword CODE extracted by the variable length decoding section 10 is included in the domain designated by domain designation information. Otherwise, the frequency domain determining section 20 outputs an inactive enable signal ENB to the embedding section 16.

As in the first embodiment, the variable length decoding section 10 extracts a codeword CODE and additional bits ADBIT and outputs the codeword length L and the additional-bit length M. In the second embodiment, the variable length decoding section 10 further outputs a run RRRR and a group number SSSS corresponding to the codeword CODE to the frequency domain determining section 20 with reference to the code table 11. In response to the active enable signal ENB from the frequency domain determining section 20, the embedding section 16 embeds the watermark information in one or more bits of the additional bits stored in the additional-bit register 12 according to the bit designation information.

[Operation of Embedding Watermark Information]

Hereinafter, operation of embedding watermark information by the above information embedding apparatus will be described with reference to the flowchart of FIG. 12.

First, in step ST701, bit designation information is applied to the embedding section 16.

Figures 13, 14, 15:
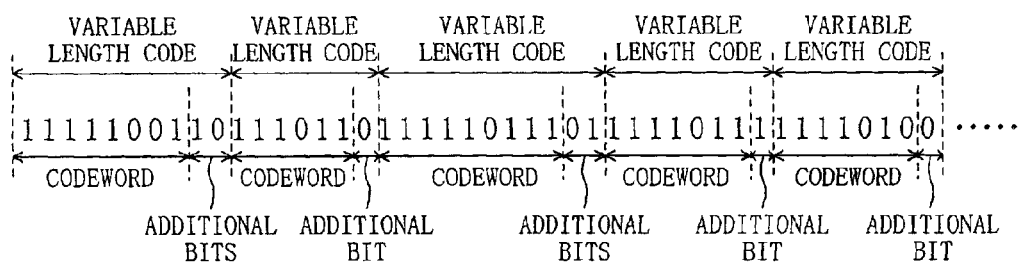
FIG. 13 shows an example of domain designation information.
FIG. 14 shows an example of variable length codes that are sequentially applied to a variable length decoding section in FIG. 11.
FIG. 15 shows a codeword, codeword length, additional bits, additional-bit length and a run/group number that are obtained for each variable length code in FIG. 14.

Thereafter, in step ST1601, domain designation information is applied to the frequency domain determining section 20. The domain designation information designates the frequency domain of a codeword corresponding to the additional bit(s) in which the watermark information is to be embedded. More specifically, as shown in FIG. 13, the domain designation information designates the minimum and maximum values MIN, MAX of the accumulated value of the sum of run RRRR and 1 (RRRR+1). The reason why the domain designation information designates the frequency domain of the codeword is as follows:

In the variable length encoding operation, a codeword is assigned to run/group number combination of the DCT coefficients by using the code table 11. For example, provided that the run/group number combination is ¾, a single codeword is assigned to four DCT coefficients (i.e., three DCT coefficients equal to zero and the following non-zero DCT coefficient). In other words, the sum of the run RRRR of a codeword and 1 (RRRR+1) indicates the number of DCT coefficients corresponding to that codeword. As shown in FIG. 3, the DCT coefficients are run-length-encoded in order of zigzag scan, that is, in order of frequency. Accordingly, by designating the minimum value MIN and the maximum value MAX of the accumulated value of (RRRR+1), the watermark information can be embedded in the additional bits corresponding to the codewords assigned to the $MIN^{th}$ to $MAX^{th}$ DCT coefficients. In FIG. 13, the watermark information is embedded in the additional bits corresponding to the codewords assigned to the fifth to twentieth DCT coefficients, i.e., the DCT coefficients C5 to C20 of FIG. 3. By designating the minimum and maximum values MIN, MAX of the accumulated value of (RRRR+1) as domain designation information, a desired frequency domain can be designated.

Thereafter, in step ST702, the variable length codes included in the image data compressed in a JPEG format are sequentially applied to the variable length decoding section 10. It is herein assumed that the variable length codes as shown in FIG. 14 are sequentially applied to the variable length decoding section 10.

Figure 7:
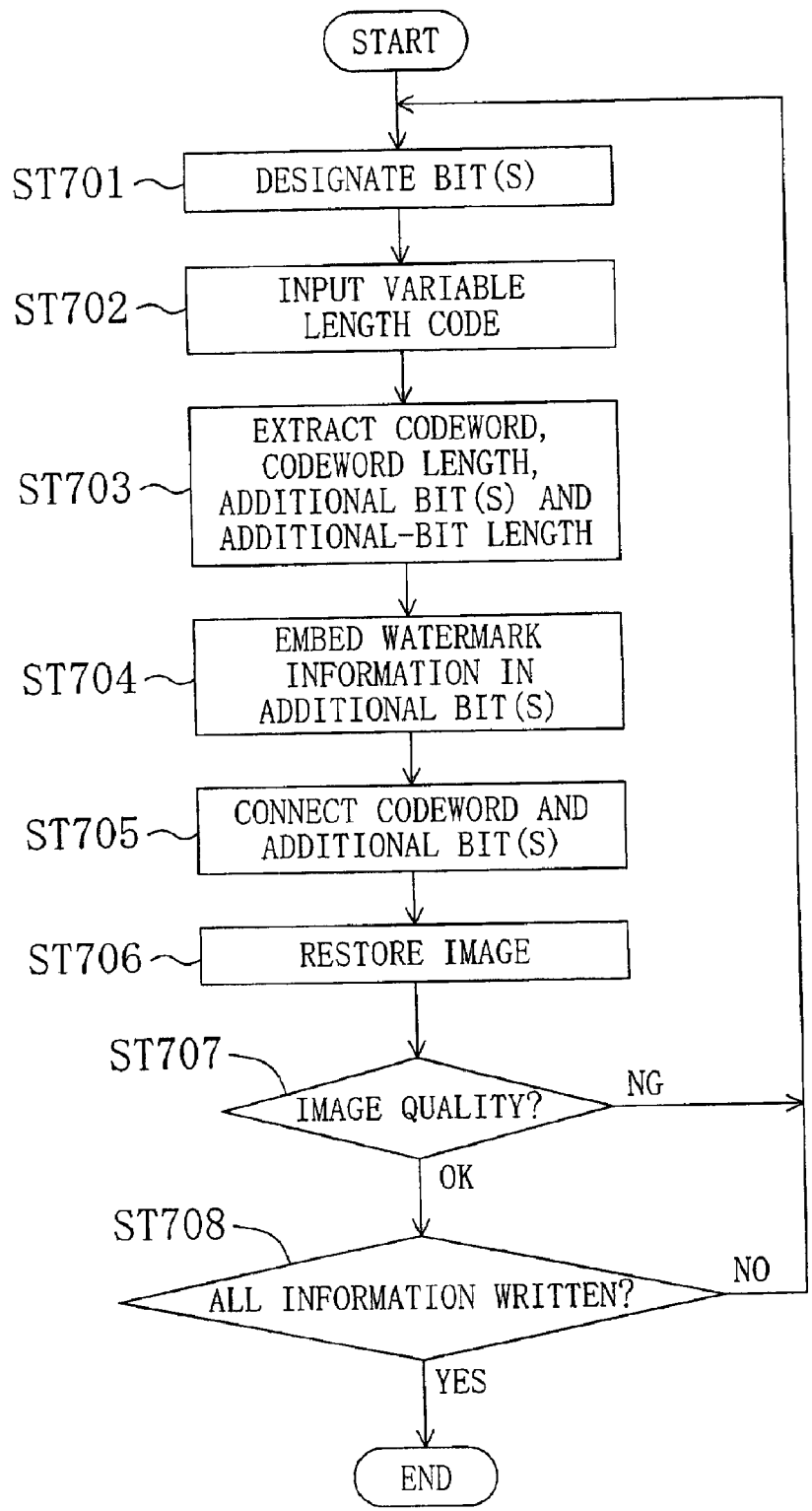
FIG. 7 is a flowchart illustrating operation of embedding watermark information by the information embedding apparatus of FIG. 1.

In step ST1602, the variable length decoding section 10 extracts the codeword CODE and the additional bit(s) ADBIT following the codeword CODE in the same manner as that in step ST703 of FIG. 7, and outputs the codeword length L and the additional-bit length M. The variable length decoding section 10 also outputs run RRRR and group number SSSS corresponding to the extracted codeword CODE to the frequency domain determining section 20. In this way, the codeword CODE, codeword length L, additional bit(s) ADBIT, additional-bit length M, run/group number (RRRR/SSSS) of each variable length code are sequentially obtained.

The codeword CODE and the additional bit(s) ADBIT extracted by the variable length decoding section 10 are temporarily stored in the codeword register 14 and the additional-bit register 12, respectively. The codeword length L and the additional-bit length M are temporarily stored in the codeword length register 15 and the additional-bit length register 13, respectively.

In step ST1603, the frequency domain determining section 20 accumulates the sum of run RRRR from the variable length decoding section 10 and 1 (RRRR+1). The frequency domain determining section 20 determines whether the accumulated value of (RRRR+1) is included in the range designated by the frequency domain information in FIG. 13. If YES in step ST1603 (i.e., if the accumulated value of (RRRR+1) is included in the range from the minimum value MIN to the maximum value MAX), the frequency domain determining section 20 outputs an active enable signal ENB to the embedding section 16. The process then proceeds to step ST704. Otherwise, the frequency domain determining section 20 outputs an inactive enable signal ENB to the embedding section 16. In response to the inactive enable signal ENB, the embedding section 16 outputs the output of the additional-bit register 12 to the data connecting section 17 without embedding the watermark information. The process then proceeds to step ST705. Note that, if the accumulated value of (RRRR+1) exceeds 64 or the extracted codeword CODE is EOB (End of Block), the accumulated value of (RRRR+1) is reset to zero.

As shown in FIG. 15, the accumulated value of (RRRR+1) is equal to 3 for the codeword "11111001". The accumulated value "3", is not within the range designated by the domain designation information. Accordingly, the frequency domain determining section 20 outputs an inactive enable signal ENB to the embedding section 16. In response to the inactive enable signal ENB, the embedding section 16 outputs the output of the additional-bit register 12 to the data connecting section 17 without embedding the watermark information. In step ST705, the data connecting section 17 connects the additional bits from the embedding section 16 with the codeword from the codeword register 14. In this way, the variable length code having no watermark information embedded therein (which is the same as the original variable length code) is obtained.

The accumulated value of (RRRR+1) is equal to 8 for the following codeword "111011". This accumulated value is within the range designated by the domain designation information. Accordingly, the frequency domain determining section 20 outputs an active enable signal ENB to the embedding section 16. In response to the active enable signal ENB, the embedding section 16 embeds the watermark information in the output of the additional-bit register 12 according to the bit designation information in step ST704. In step ST705, the data connecting section 17 then connects the additional bit from the embedding section 16 with the codeword from the codeword register 14. In this way, the variable length code having the watermark information embedded therein is obtained.

Similarly, the variable length codes having the watermark information embedded therein are obtained for the codewords "111110111 ", "1111011", and the variable length code having no watermark information embedded therein is obtained for the codeword "1111010".

Every variable length code included in the compressed image data is subjected to the above operations. The compressed image data having the watermark information embedded in the frequency domain designated by the domain designation information is thus obtained.

In step ST706, the compressed image having the watermark information embedded therein is restored (decompressed).

In step ST707, the quality of the restored image is evaluated. If the image quality is not acceptable (NG in step ST707), the process returns to step ST701 or ST1601. When the process returns to step ST701, bit designation information designating a reduced number of bits for embedding the watermark information is applied to the embedding section 16. When the process returns to step ST1601, domain designation information designating a reduced frequency domain (i.e., designating an increased minimum value MIN and/or a reduced maximum value MAX) is applied to the frequency domain determining section 20. Thereafter, steps ST702 to ST706 are conducted again.

If the image quality is acceptable (OK in step ST707), the process proceeds to step ST708. In step ST708, whether the watermark information to be embedded has been completely embedded or not is determined. If YES in step ST708, the process is completed. If NO in step ST708 (i.e., if it is determined that part of the watermark information has not been embedded), the process returns to step ST701 or ST1601. When the process returns to step ST701, bit designation information designating an increased number of bits for embedding the watermark information is applied to the embedding section 16. When the process returns to step ST1601, domain designation information designating an increased frequency domain (i.e., designating a reduced minimum value MIN and/or an increased maximum value MAX) is applied to the frequency domain determining section 20. Thereafter, steps ST702 to ST707 are conducted again.

[Effects]

The image having watermark information embedded therein normally has degraded quality as compared to the original image. However, the human eyes are sensitive to a change in low frequency components, but insensitive to a change in high frequency components.

The information embedding apparatus of the second embodiment is capable of embedding the watermark information in the additional bit(s) corresponding to the codeword included in the frequency domain designated by the domain designation information. For example, in order to prevent degradation in image quality resulting from embedding of the watermark information from being perceived, domain designation information designating a relatively high frequency domain is applied. In contrast, for the image that cannot be viewed until license fee is paid, the watermark information is intentionally presented to the unauthorized user in a visual form. In this case, domain designation information designating a relatively low frequency domain is applied. In this way, the watermark information can be embedded in an appropriate frequency domain according to applications and purposes.

If the restored image has extremely poor quality, domain designation information designating a reduced frequency domain is applied to the frequency domain determining section 20, and the embedding operation is conducted again. This suppresses degradation in quality of the compressed image having the watermark information embedded therein.

Moreover, if part of the watermark information to be embedded has not been embedded, domain designation information designating an increased frequency domain is applied to the frequency domain determining section 20, and the embedding operation is conducted again. This enables all the watermark information to be embedded reliably.

Note that the domain designation information herein designates both minimum and maximum values MIN, MAX of the accumulated value. Alternatively, the domain designation information may designate either the minimum value MIN or the maximum value MAX.

Moreover, the same effects as those of the first embodiment can be obtained by the information embedding apparatus of the second embodiment.

The watermark information is herein embedded in the image data compressed in a JPEG format. However, the same effects can be obtained even when the watermark information is embedded in the image data compressed in an MPEG format.

The information embedding apparatus of the second embodiment does not necessarily require hardware configuration, but may be implemented by software.

(Third Embodiment)
[Overall Structure]

Figure 16:
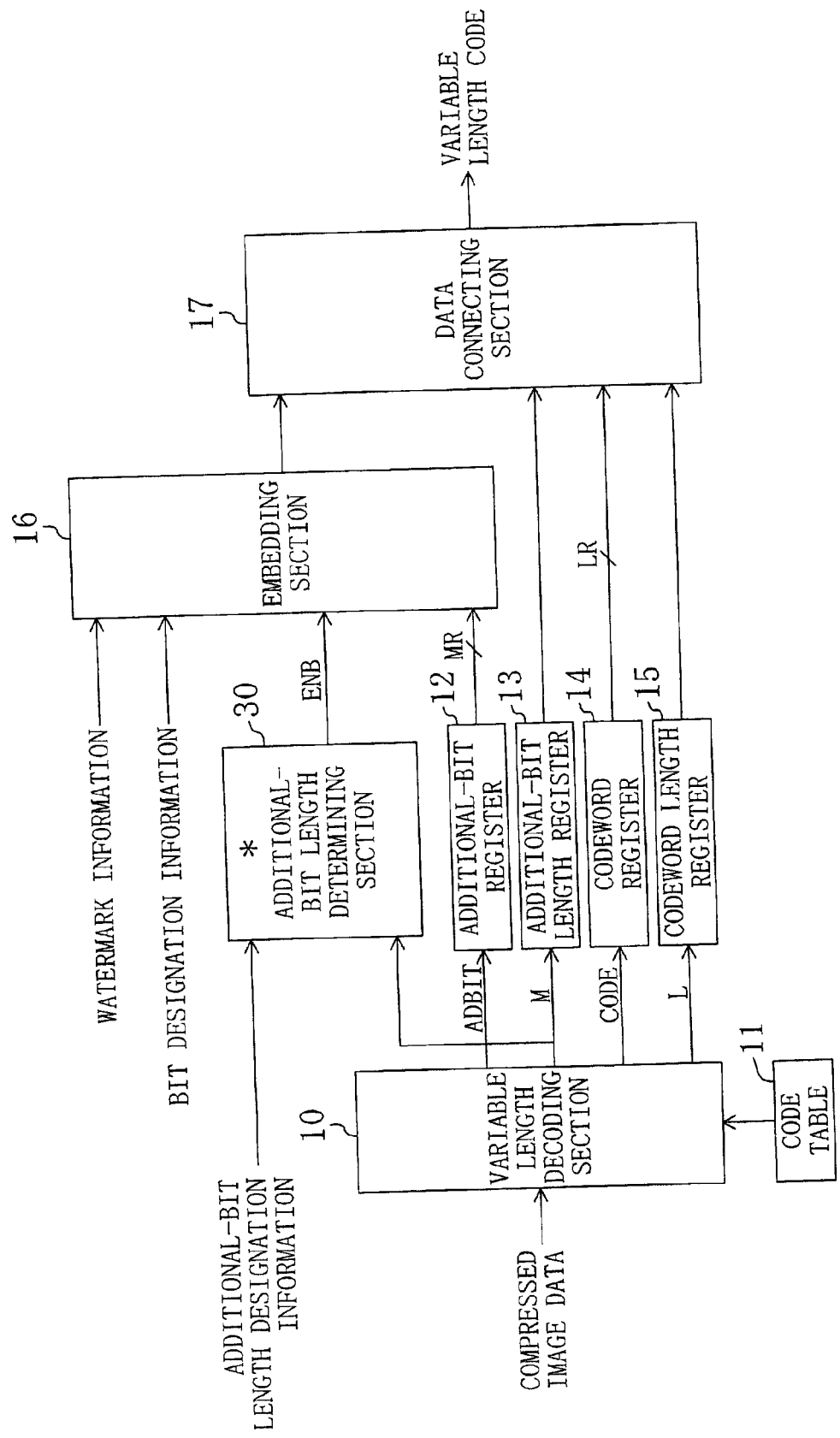
FIG. 16 is a block diagram showing the overall structure of an information embedding apparatus according to a third embodiment of the present invention.

FIG. 16 is a block diagram showing the overall structure of an information embedding apparatus according to the third embodiment of the present invention. Referring to FIG. 16, this information embedding apparatus further includes an additional-bit length determining section 30 in addition to the components of the information embedding apparatus of FIG. 1. The additional-bit length determining section 30 outputs an active enable signal ENB to the embedding section 16 when the additional-bit length M from the variable length decoding section 10 is within the range designated by additional-bit length designation information. Otherwise, the additional-bit length determining section 30 outputs an inactive enable signal ENB to the embedding section 16. In response to the active enable signal ENB, the embedding section 16 embeds the watermark information in one or more bits of the additional bits stored in the additional-bit register 12 according to bit designation information.

[Operation of Embedding Watermark Information]

Figure 17:
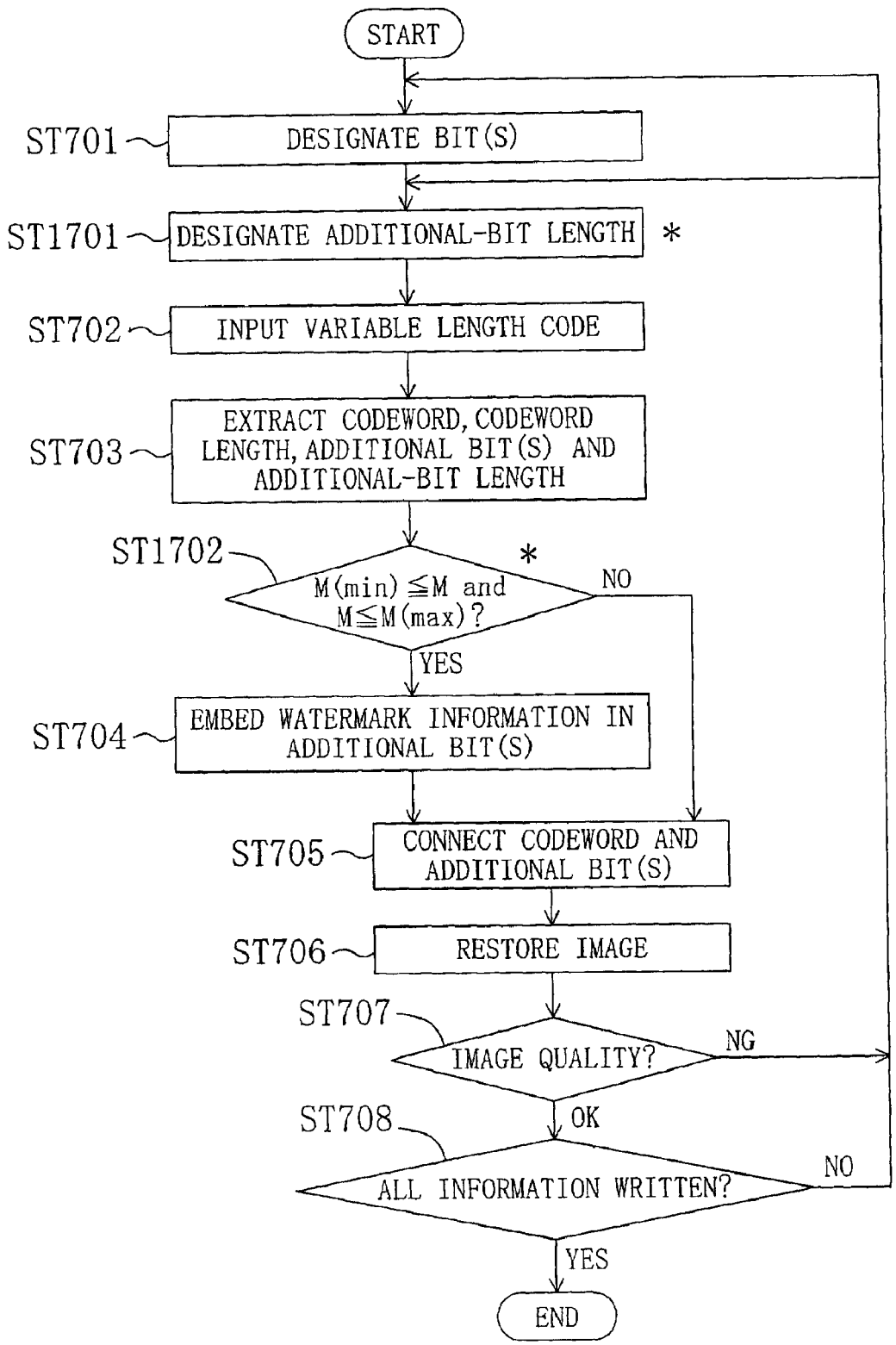
FIG. 17 is a flowchart illustrating operation of embedding watermark information by the information embedding apparatus in FIG. 16.

Hereinafter, operation of embedding watermark information by the above information embedding apparatus will be described with reference to the flowchart of FIG. 17.

First, in step ST701, bit designation information is applied to the embedding section 16.

In step ST1701, additional-bit length designation information is applied to the additional-bit length determining section 30. The additional-bit length designation information designates the bit length of the additional bits in which the watermark information is to be embedded. More specifically, as shown in FIG. 18, the additional-bit length designation information designates the minimum bit length M(min) and the maximum bit length M(max).

In step ST702, variable length codes included in the image data compressed in a JPEG format are sequentially applied to the variable length decoding section 10.

In step ST703, the variable length decoding section 10 extracts a codeword CODE and an additional bit(s) ADBIT following the codeword CODE, and outputs the codeword length L and the additional-bit length M. The codeword CODE and the additional bit(s) ADBIT extracted by the variable length decoding section 10 are temporarily stored in the codeword register 14 and the additional-bit register 12, respectively. The codeword length L and the additional-bit length M are temporarily stored in the codeword length register 15 and the additional-bit length register 13, respectively.

In step ST1702, the additional-bit length determining section 30 determines whether the additional-bit length M from the variable length decoding section 10 is included in the range designated by the additional-bit length designation information. If YES in step ST1702 (i.e., if the additional-bit length M is included in the range from the minimum bit length M(min) to the maximum bit length M(max)), the additional-bit length determining section 30 outputs an active enable signal ENB to the embedding section 16. In response to the active enable signal ENB, the embedding section 16 embeds the watermark information in the output of the additional-bit register 12 according to the bit designation information in step ST704. In step ST705, the data connecting section 17 connects the additional bits from the embedding section 16 with the codeword from the codeword register 14. In this way, the variable length code having the watermark information embedded therein is obtained. If NO in step ST1702 (i.e., if the additional-bit length M is smaller than the minimum bit length M(min) or greater than the maximum bit length M(max)), the additional-bit length determining section 30 outputs an inactive enable signal ENB to the embedding section 16. In response to the inactive enable signal ENB, the embedding section 16 outputs the output of the additional-bit register 12 to the data connecting section 17 without embedding the watermark information. In step ST705, the data connecting section 17 connects the additional bits from the embedding section 16 with the codeword from the codeword register 14. In this way, the variable length code having no watermark information embedded therein (which is the same as the original variable length code) is obtained.

Every variable length code included in the compressed image data is subjected to the above operations. Thus, the resultant compressed image has the watermark information embedded according to the additional-bit length designation information.

Thereafter, in step ST706, the compressed image having the watermark information embedded therein is restored (decompressed).

In step ST707, quality of the restored image is evaluated. If the image quality is not acceptable (NG in step ST707), the process returns to step ST701 or ST1701. When the process returns to step ST701, bit designation information designating a reduced number of bits for embedding the watermark information is applied to the embedding section 16. When the process returns to step ST1701, additional-bit length designation information designating a reduced range of the additional-bit length (i.e., designating an increased minimum bit length M(min) and/or a reduced maximum bit length M(max)) is applied to the additional-bit length determining section 30. Thereafter, steps ST702 to ST706 are conducted again.

If the image quality is acceptable (OK in step ST707), the process proceeds to step ST708. In step ST708, whether the watermark information to be embedded has been completely embedded or not is determined. If YES in step ST708, the process is completed. If NO in step ST708 (i.e., if it is determined that part of the watermark information has not been embedded), the process returns to step ST701 or ST1701. When the process returns to step ST701, bit designation information designating an increased number of bits for embedding the watermark information is applied to the embedding section 16. When the process returns to step ST1701, additional-bit length designation information designating an increased range of the additional-bit length (i.e., designating a reduced minimum bit length M(min) and/or an increased maximum bit length M(max)) is applied to the additional-bit length determining section 30. Thereafter, steps ST702 to ST707 are conducted again.

[Effects]

The number of codewords included in the compressed image data varies between individual images. If a relatively large amount of data is to be embedded as the watermark information, the watermark information must be embedded in the additional bits corresponding to all the codewords included in the compressed image data. However, if a relatively small amount of data is to be embedded as the watermark information, the watermark information need not necessarily be embedded in the additional bits corresponding to all the codewords. In other words, the watermark information need only be embedded in the additional bit(s) corresponding to one or more of the codewords. Degradation in image quality is less likely to be perceived when the watermark information is embedded only in the additional bit(s) corresponding to a less frequently occurring codeword (i.e., a codeword that is included in the compressed image data at a lower rate) than when the watermark information is embedded only in the additional bit(s) corresponding to a frequently occurring codeword (i.e., a codeword that is included in the compressed image data at a higher rate).

Normally, a quantized DCT coefficient having a greater value occurs less frequently. Moreover, as shown in FIG. 4, a greater group number SSSS is assigned to a greater quantized DCT coefficient (i.e., a less frequently occurring quantized DCT coefficient). Moreover, a greater number of additional bits are assigned to a greater group number SSSS. Accordingly, a greater number of additional bits are assigned to a less frequently occurring quantized DCT coefficient. As shown in FIG. 6, the code table is normally preset such that a greater codeword length (code length) is assigned to a greater group number SSSS. In other words, a less frequently occurring codeword (i.e., a codeword that is included in the compressed image data at a lower rate) corresponds to a greater group number and a greater number of additional bits (a greater bit length).

The information embedding apparatus of the third embodiment embeds the watermark information in the additional bits having a bit length within the range designated by the additional-bit length designation information. Accordingly, when a relatively small amount of data is to be embedded as the watermark information, the watermark information is embedded in the additional bits having a relatively long bit length (i.e., less frequently occurring bits). In this case, the locations where the watermark information is embedded are dispersed on the screen. As a result, degradation in image quality is less likely to be perceived. The watermark information can thus be embedded in the additional bits having an appropriate bit length according to applications and purposes.

If the restored image has extremely poor quality, additional-bit length designation information designating a reduced range of the bit length is applied to the additional-bit length determining section 30, and the embedding operation is conducted again. This suppresses degradation in quality of the compressed image having the watermark information embedded therein.

If part of the watermark information to be embedded has not been embedded, additional-bit length designation information designating an increased range of the bit length is applied to the additional-bit length determining section 30, and the embedding operation is conducted again. This enables all the watermark information to be embedded reliably.

Note that the additional-bit length designation information herein designates both minimum and maximum bit lengths M(min), M(max). Alternatively, the additional-bit length designation information may designate either the minimum bit length M(min) or the maximum bit length M(max).

Moreover, the same effects as those of the first embodiment can be obtained by the information embedding apparatus of the third embodiment.

The watermark information is herein embedded in the image data compressed in a JPEG format. However, the same effects can be obtained even when the watermark information is embedded in the image data compressed in an MPEG format.

The information embedding apparatus of the third embodiment does not necessarily require hardware configuration, but may be implemented by software.

(Fourth Embodiment)

[Overall Structure]

Figure 19:
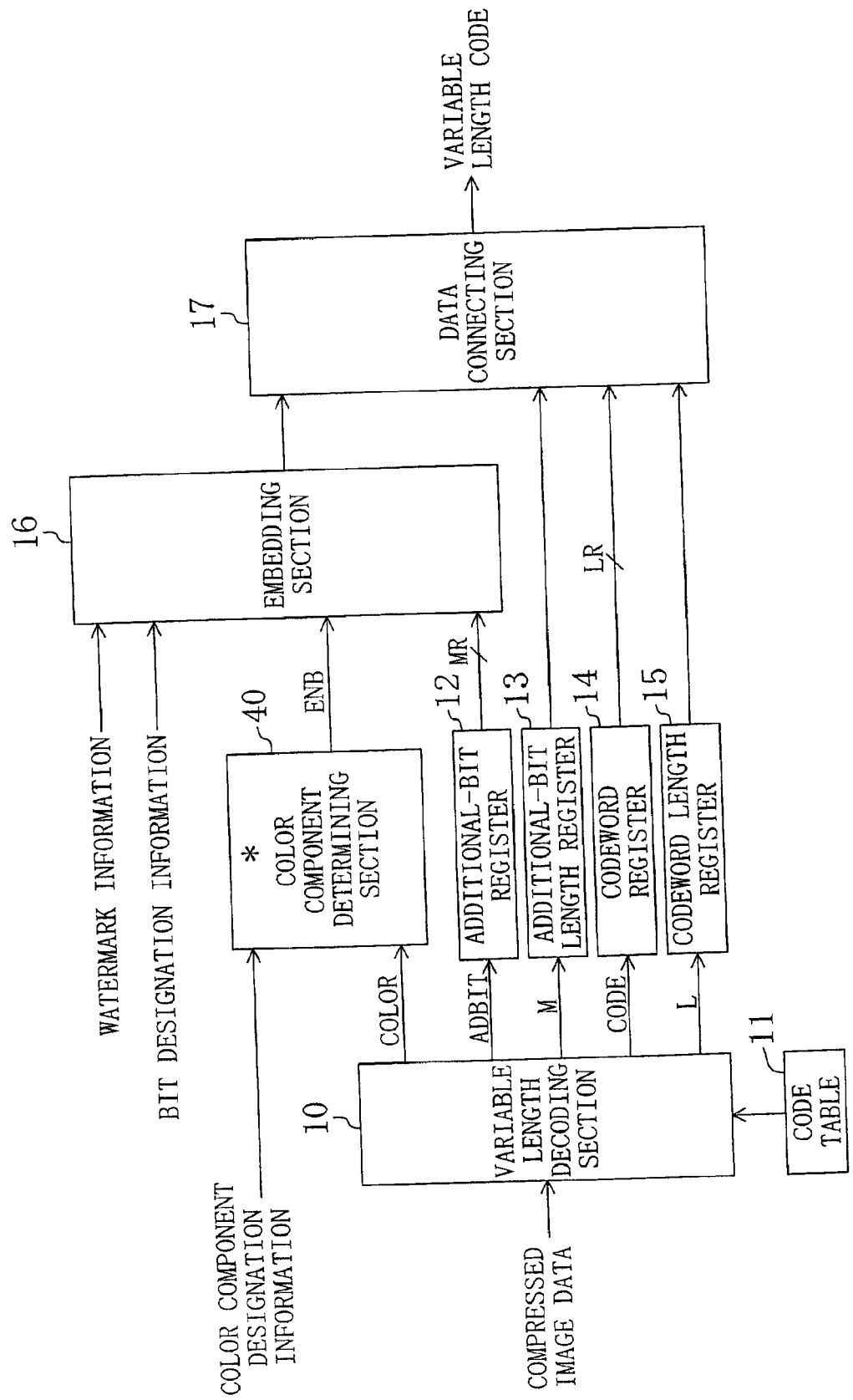
FIG. 19 is a block diagram showing the overall structure of an information embedding apparatus according to a fourth embodiment of the present invention.

FIG. 19 is a block diagram showing the overall structure of an information embedding apparatus according to the fourth embodiment of the present invention. The information embedding apparatus of FIG. 19 further includes a color component determining section 40 in addition to the components of the information embedding apparatus of FIG. 1. The color component determining section 40 outputs an active enable signal ENB to the embedding section 16 when color component information COLOR extracted by the variable length decoding section 10 matches a color component designated by color component designation information. Otherwise, the color component determining section 40 outputs an inactive enable signal ENB to the embedding section 16.

As in the above embodiments, the variable length decoding section 10 extracts a codeword CODE and an additional bit(s) ADBIT and outputs the codeword length L and the additional-bit length M. In the fourth embodiment, the variable length decoding section 10 further extracts the color component information COLOR from the compressed image data for output to the color component determining section 40. The color component information COLOR indicates color components (Y, U, V) of a variable length code applied to the variable length decoding section 10. In response to the active enable signal ENB from the color component determining section 40, the embedding section 16 embeds watermark information in one or more bits of the additional bits stored in the additional-bit register 12 according to the bit designation information.

[Operation of Embedding Watermark Information]

Figure 20:
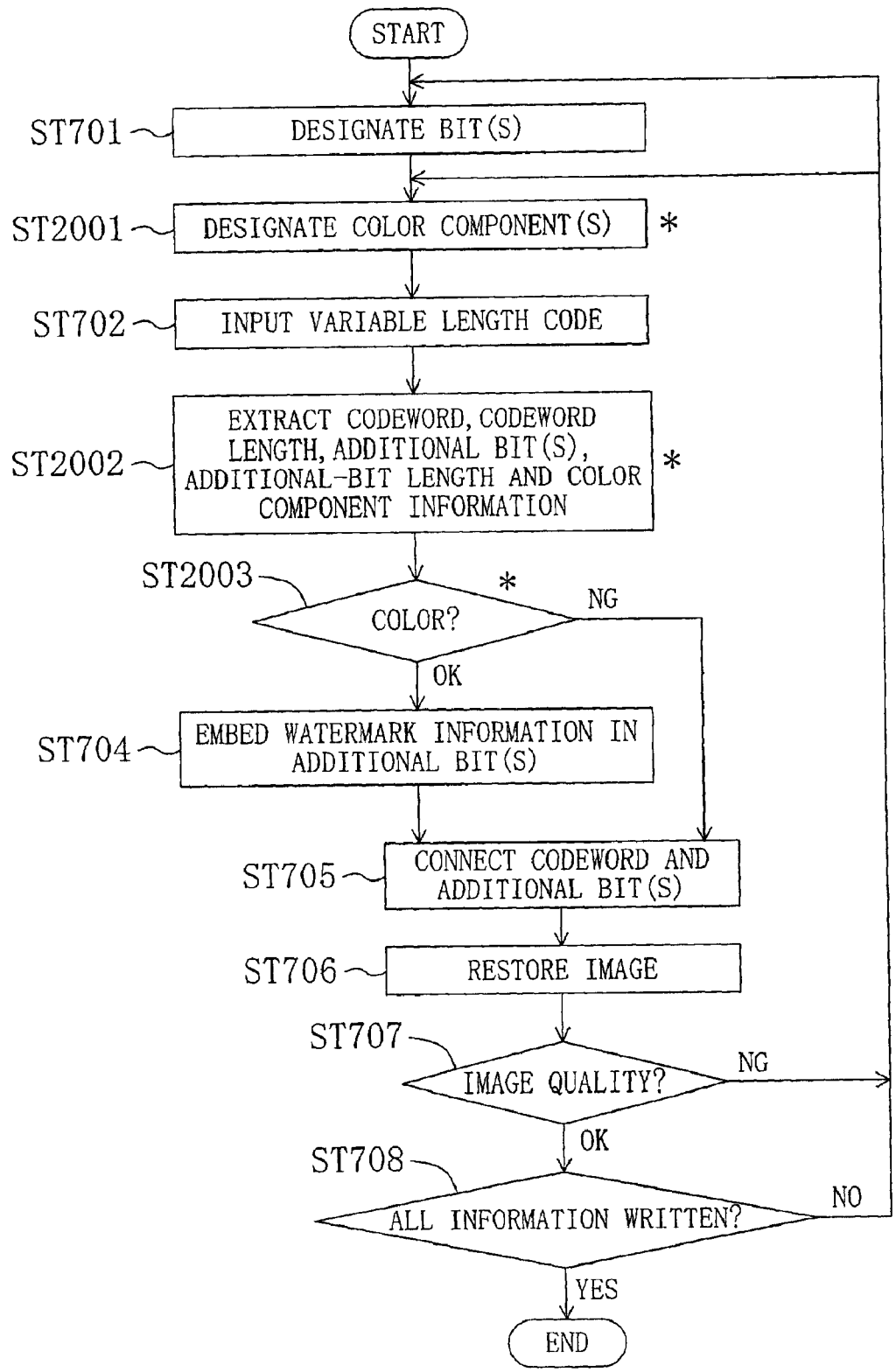
FIG. 20 is a flowchart illustrating operation of embedding watermark information by the information embedding apparatus in FIG. 19.

Hereinafter, operation of embedding watermark information by the above information embedding apparatus will be described with reference to the flowchart of FIG. 20.

First, in step ST701, bit designation information is applied to the embedding section 16.

In step ST2001, color component designation information is applied to the color component determining section 40. The color component designation information designates a color component or components in which the watermark information is to be embedded. The "color components" refers to a luminance component Y and chrominance components U, V, which are elements of the image data. More specifically, as shown in FIG. 21, the color component designation information includes designation information YE of the luminance component and designation information UE, VE of the chrominance components. The designation information YE, UE, VE is set to 1 when the watermark information is to be embedded in a corresponding color component. The designation information YE, UE, VE is set to zero when no watermark information is to be embedded in a corresponding color component. For example, in FIG. 21, the color component designation information of YE=0, UE=1, VE=1 indicates that no watermark information is to be embedded in the additional bits of the luminance component Y and the watermark information is to be embedded only in the additional bits of the chrominance components U, V.

In step ST702, variable length codes included in the image data compressed in a JPEG format are sequentially applied to the variable length decoding section 10.

In step ST2002, the variable length decoding section 10 extracts a codeword CODE and an additional bit(s) ADBIT following the codeword CODE and outputs the codeword length L and the additional-bit length M in the same manner as that in step ST703 in FIG. 7. The variable length decoding section 10 further extracts the color component information COLOR from the compressed image data for output to the color component determining section 40. The codeword CODE and the additional bit(s) ADBIT extracted by the variable length decoding section 10 are temporarily stored in the codeword register 14 and the additional-bit register 12, respectively. The codeword length L and the additional-bit length M are temporarily stored in the codeword length register 15 and the additional-bit length register 13, respectively.

In step ST2003, the color component determining section 40 compares the color component information COLOR from the variable length decoding section 10 with the color component designation information. If any of the designation information YE, UE, VE having a value "1" matches the color component information COLOR (OK in step ST2003), the color component determining section 40 outputs an active enable signal ENB to the embedding section 16. In response to the active enable signal ENB, the embedding section 16 embeds the watermark information in the output of the additional-bit register 12 according to the bit designation information in step ST704. In step ST705, the data connecting section 17 connects the additional bits from the embedding section 16 with the codeword from the codeword register 14. In this way, the variable length code having the watermark information embedded therein is obtained.

If none of the designation information YE, UE, VE having a value "1" matches the color component information COLOR (NG in step ST2003), the color component determining section 40 outputs an inactive enable signal ENB to the embedding section 16. In response to the inactive enable signal ENB, the embedding section 16 outputs the output of the additional-bit register 12 to the data connecting section 17 without embedding the watermark information. In step ST705, the data connecting section 17 connects the additional bits from the embedding section 16 with the codeword from the codeword register 14. In this way, the variable length code having no watermark information embedded therein (which is the same as the original variable length code) is obtained.

Every variable length code included in the compressed image data is subjected to the above operations. Thus, the resultant compressed image data has the watermark information embedded in the additional bits corresponding to the codeword of the color component designated by the color component designation information.

In step ST706, the compressed image having the watermark information embedded therein is restored (decompressed).

In step ST707, quality of the restored image is evaluated. If the image quality is not acceptable (NG in step ST707), the process returns to step ST701 or ST2001. When the process returns to step ST701, bit designation information designating a reduced number of bits for embedding the watermark information is applied to the embedding section 16. When the flow returns to step ST2001, color component designation information indicating different designation information YE, UE, VE is applied to the color component determination section 40. For example, the color component designation information (YE=0, UE=1, VE=0) is applied instead of the color component designation information (YE=1, UE=0, VE=0). This is based on the property that "the human eyes are sensitive to a change in luminance component, but insensitive to a change in chrominancecomponent". Thereafter, steps ST702 to ST706 are conducted again.

If the quality is acceptable (OK in step ST707), the process proceeds to step ST708. In step ST708, whether the watermark information to be embedded has been completely embedded or not is determined. If YES in step ST708, the process is completed. If NO in step ST708 (i.e., if it is determined that part of the watermark information has not been embedded), the process returns to step ST701 or ST2001. When the process returns to step ST701, bit designation information designating an increased number of bits for embedding the watermark information is applied to the embedding section 16. When the process returns to step ST2001, color component designation information designating an increased number of color components for embedding the watermark information is applied to the color component determining section 40. For example, the color component designation information (YE=1, UE=1, VE=0) is applied instead of the color component designation information (YE=1, UE=0, VE=0). Thereafter, steps ST702 to ST707 are conducted again.

[Effects]

Normally, the image having watermark information embedded therein has degraded quality as compared to the original image. However, the human eyes are sensitive to a change in luminance component, but insensitive to a change in chrominancecomponent.

The information embedding apparatus of the fourth embodiment is capable of embedding watermark information in the additional bit(s) corresponding to the codeword of the color component designated by the color component designation information. For example, in order to prevent degradation in image quality resulting from embedding of the watermark information from being perceived, watermark information is embedded in the additional bit(s) corresponding to the codeword of the chominancecomponent. This suppresses the influence of degradation in image quality. In this way, the watermark information can be embedded in the additional bit(s) corresponding to the codeword of an appropriate color component according to applications and purposes.

If the restored image has extremely poor quality, color component designation information indicating different designation information (YE, UE, VE) is applied to the color component determining section 40, and the embedding operation is conducted again. This suppresses degradation in quality of the compressed image having watermark information embedded therein.

If part of the watermark information has not been embedded, color component designation information designating an increased number of color components for embedding the watermark information is applied to the color component determining section 40, and the embedding operation is conducted again. This enables all the watermark information to be embedded reliably.

Note that the same effects as those of the first embodiment can be obtained by the information embedding apparatus of the fourth embodiment.

The watermark information is herein embedded in the image data compressed in a JPEG format. However, the same effects can be obtained even when the watermark information is embedded in the image data compressed in an MPEG format.

The information embedding apparatus of the fourth embodiment does not necessarily require hardware configuration, but may be implemented by software.

(Fifth Embodiment)
[Overall Structure]

Figure 22:
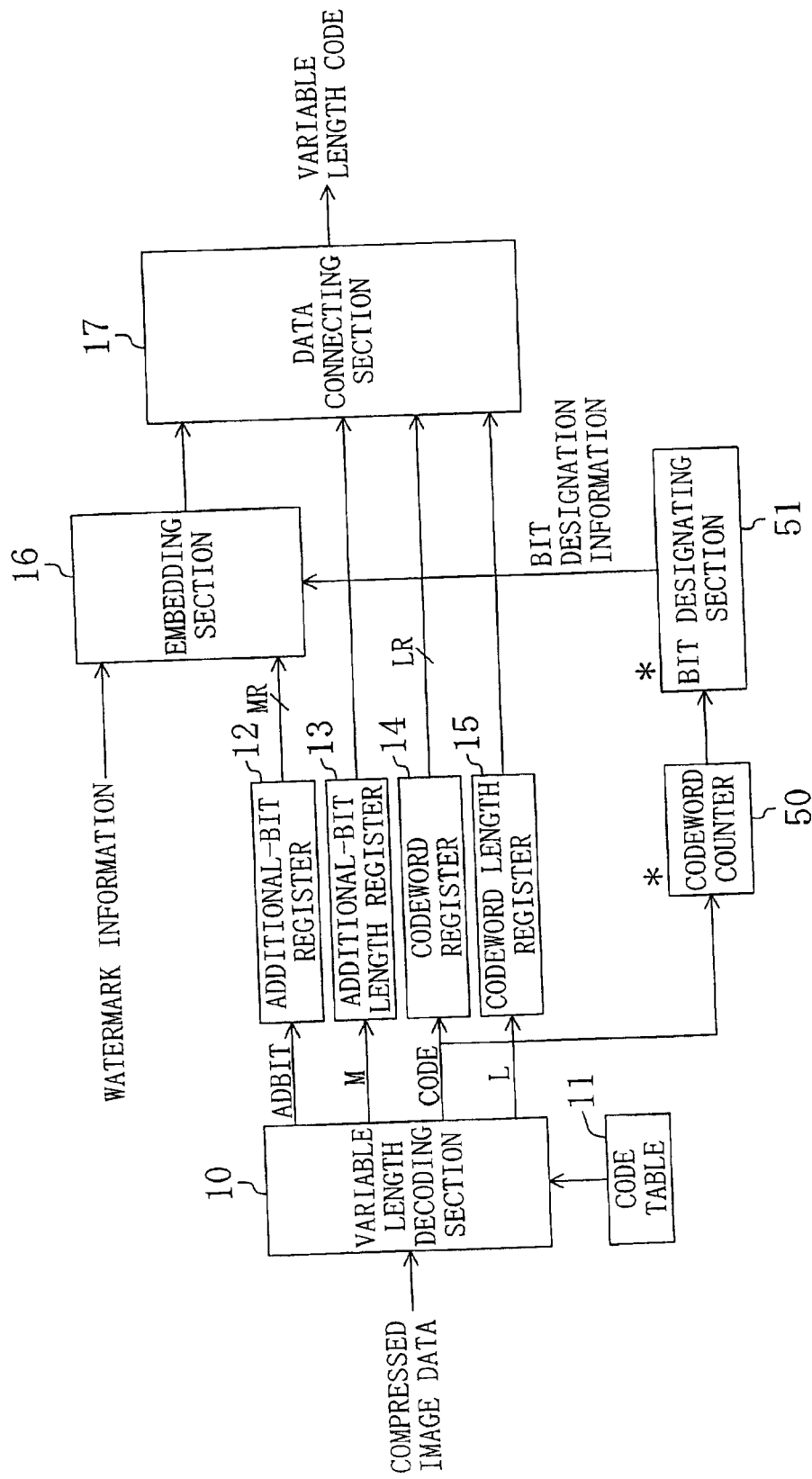
FIG. 22 is a block diagram showing the overall structure of an information embedding apparatus according to a fifth embodiment of the present invention.

FIG. 22 is a block diagram showing the overall structure of an information embedding apparatus according to the fifth embodiment of the present invention. The information embedding apparatus of FIG. 22 further includes a codeword counter 50 and a bit designating section 51 in addition to the components of the information embedding apparatus of FIG. 1. The codeword counter 50 counts the number of codewords CODE extracted by the variable length decoding section 10. The bit designating section 51 produces bit designation information based on the number of codewords counted by the codeword counter 50 and the amount of watermark information to be embedded, and outputs the bit designation information to the embedding section 16.

[Preprocessing]

Figure 23:
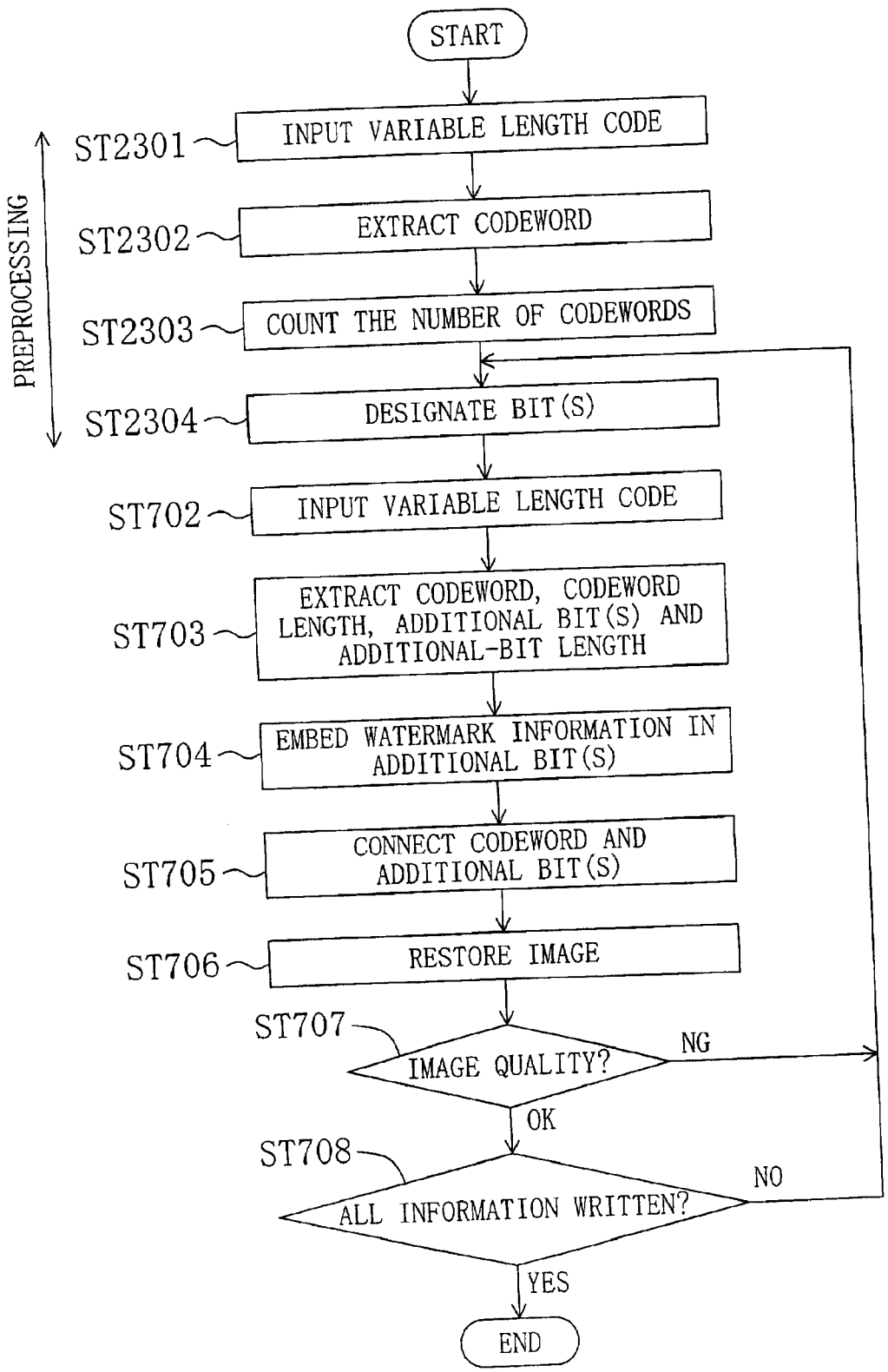
FIG. 23 is a flowchart illustrating operation of embedding watermark information by the information embedding apparatus in FIG. 22.

Hereinafter, operation of embedding watermark information by the information embedding apparatus of FIG. 22 will be described with reference to FIG. 23. The preprocessing (ST2301 to ST2304) that is different from the processing in the flowchart of FIG. 7 will be described below.

First, in step ST2301, variable length codes included in the image data compressed in a JPEG format are sequentially applied to the variable length decoding section 10 in the same manner as that in step ST702 of FIG. 7.

In step ST2302, the variable length decoding section 10 sequentially extracts codewords CODE in the same manner as that in step ST703 of FIG. 7.

In step ST2303, the codeword counter 50 counts the number of codewords extracted by the variable length decoding section 10. After counting all the codewords included in the compressed image data, the codeword counter 50 outputs the number of codewords CODE(MAX) to the bit designating section 51.

In step ST2304, the bit designating section 51 produces bit designation information based on the number of codewords CODE(MAX) included in the compressed image data and the data amount of watermark information to be embedded DINFO, and outputs the bit designation information to the embedding section 16. This operation will now be described specifically.

(1) For DINFO<CODE(MAX)

When the data amount of watermark information to be embedded is smaller than the number of codewords included in the compressed image data, the watermark information need only be embedded in one bit of an additional-bit value. Accordingly, the bit designating section 51 produces bit designation information that designates one bit of an additional-bit value for embedding the watermark information.

(2) For DINFO>CODE(MAX)

When the data amount of watermark information to be embedded is larger than the number of codewords included in the compressed image data, designating only one bit of an additional-bit value is not enough to embed all the watermark information. More specifically, if one bit of an additional-bit value is designated as a bit for embedding the watermark information, part of the watermark information fails to be embedded, and therefore the embedding operation is conducted again. Accordingly, a plurality of bits in an additional-bit value must be designated as bits for embedding the watermark information. The bit designating section 51 obtains an integer MJ satisfying the following expression:

$$MJ > DINFO/CODE(MAX).$$

The bit designating section 51 then produces bit designation information that designates MJ additional bits for embedding the watermark information. It is desirable to select the smallest possible value MJ from those satisfying the above condition. This enables the watermark information to be embedded uniformly on the screen. As a result, degradation in image quality becomes less likely to be perceived as compared to the case where the watermark information is embedded intensively in a part of the screen (e.g., the watermark information is embedded only in the upper half of the screen).

After such preprocessing, the variable length codes are applied again (step ST702), and the embedding operation is conducted sequentially (steps ST703 to ST708).

[Effects]

As has been described above, the information embedding apparatus of the fifth embodiment produces bit designation information based on the number of codewords CODE (MAX) included in the compressed image data and the data amount of watermark information to be embedded DINFO. This prevents the embedding operation from being conducted again. Moreover, this enables the watermark information to be embedded uniformly so as to prevent degradation in image quality from being perceived as much as possible.

Note that the same effects as those of the first embodiment can be obtained by the information embedding apparatus of the fifth embodiment.

The watermark information is herein embedded in the image data compressed in a JPEG format. However, the same effects can be obtained even when the watermark information is embedded in the image data compressed in an MPEG format.

The information embedding apparatus of the fifth embodiment does not necessarily require hardware configuration, but may be implemented by software.

(Sixth Embodiment)
[Overall Structure]

Figure 24:
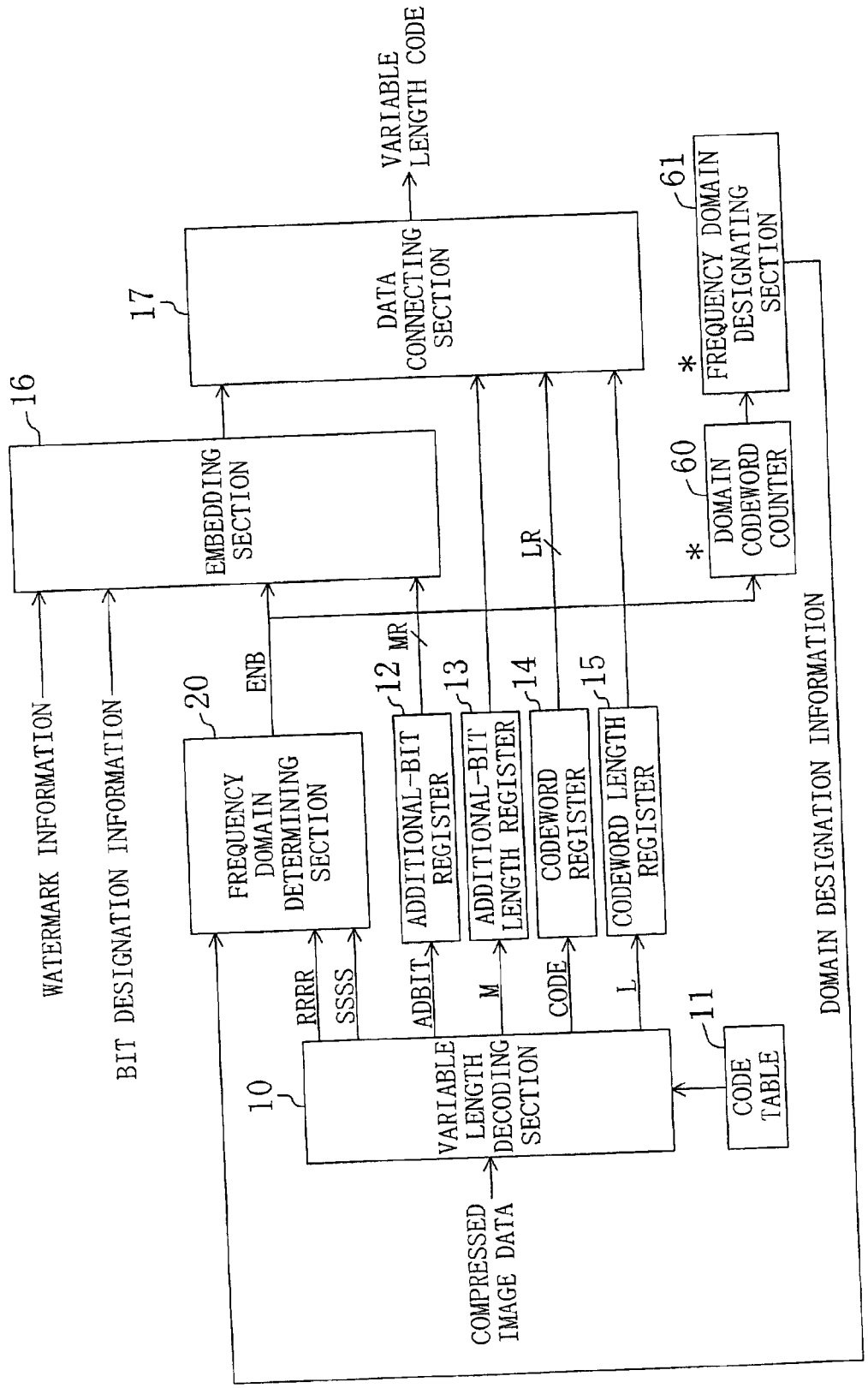
FIG. 24 is a block diagram showing the overall structure of an information embedding apparatus according to a sixth embodiment of the present invention.

FIG. 24 is a block diagram showing the overall structure of an information embedding apparatus according to the sixth embodiment of the present invention. The information embedding apparatus of FIG. 24 further includes a domain codeword counter 60 and a frequency domain designating section 61 in addition to the components of the information embedding apparatus of FIG. 11. The domain codeword counter 60 counts the number of active enable signals ENB output from the frequency domain determining section 20. The frequency domain designating section 61 produces domain designation information based on the number of enable signals ENB counted by the domain codeword counter 60 for output to the frequency domain determining section 20.

[Preprocessing]

Figure 25:
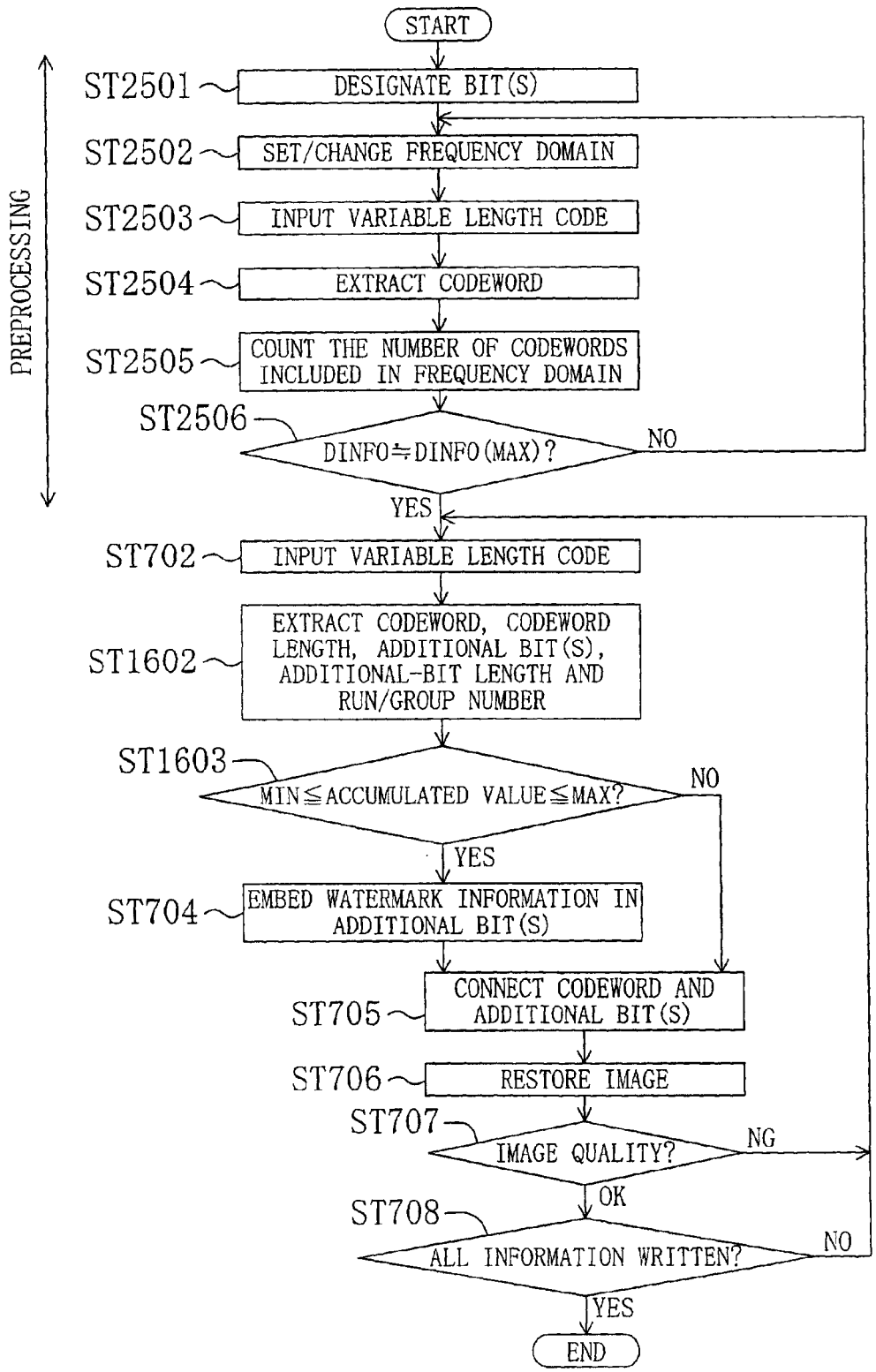
FIG. 25 is a flowchart illustrating operation of embedding watermark information by the information embedding apparatus in FIG. 24.

Hereinafter, operation of embedding watermark information by the information embedding apparatus of FIG. 24 will be described with reference to FIG. 25. The preprocessing (steps ST2501 to ST2506) that is different from the processing in the flowchart of FIG. 12 will be described below.

Figure 12:
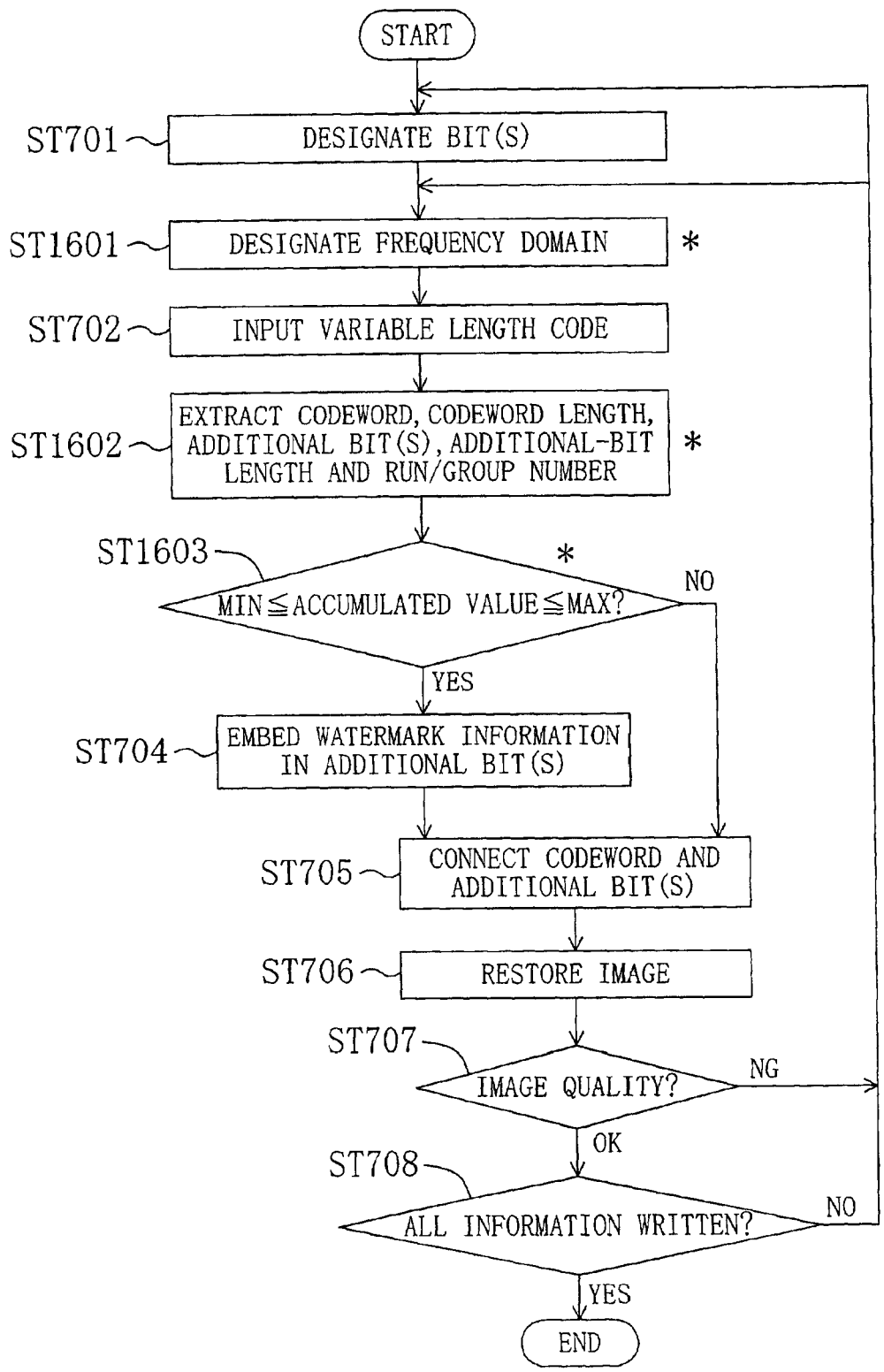
FIG. 12 is a flowchart illustrating operation of embedding watermark information by the information embedding apparatus of FIG. 11.

In step ST2501, bit designation information is applied to the embedding section 16 in the same manner as that in step ST701 of FIG. 12. In step ST2502, the frequency domain designating section 61 produces domain designation information designating a prescribed domain (second frequency domain) for output to the frequency domain determining section 20. This domain designation information is the same as that shown in FIG. 13.

In step ST2503, variable length codes included in the image data compressed in a JPEG format are sequentially applied to the variable length decoding section 10 in the same manner as that in step ST702 of FIG. 12.

In step ST2504, the variable length decoding section 10 sequentially extracts codewords CODE and outputs run RRRR and group number SSSS corresponding to the extracted codeword CODE to the frequency domain determining section 20 in the same manner as that in step ST1602 of FIG. 12.

In step ST2505, the frequency domain determining section 20 accumulates the sum of the run RRRR from the variable length decoding section 10 and 1 (RRRR+1) in the same manner as that in step ST1603 in FIG. 12. It is then determined whether the accumulated value of (RRRR+1) is within the range designated by the domain designation information or not. If it is determined that the accumulated value is within the range designated by the domain designation information, the frequency domain designating section 20 outputs an active enable signal ENB to the embedding section 16. Otherwise, the frequency domain designating section 20 outputs an inactive enable signal ENB to the embedding section 16.

The domain codeword counter 60 counts the number of active enable signals ENB output from the frequency domain determining section 20. The number of codewords in the domain designated by the domain designation information (the second frequency domain) is thus counted. After counting all the codewords included in the compressed image data, the domain codeword counter 60 outputs a count value CODE(ENB) to the frequency domain designating section 61. This count value CODE(ENB) indicates the number of codewords included in the second frequency domain out of the codewords included in the compressed image data.

In step ST2506, the frequency domain designating section 61 first calculates the maximum value DINFO(MAX) of the data amount of watermark information that can be embedded in the compressed image data. The maximum value DINFO(MAX) is calculated by the following equation:

$$DINFO(MAX) = MJ \times CODE(ENB)$$

where MJ is the number of bits in which the watermark information is to be embedded in a single additional-bit value.

The frequency domain designating section 61 then compares the data amount of watermark information to be embedded, DINFO, with the maximum value DINFO (MAX), and conducts the following operation based on the comparison result:

(1) For DINFO<DINFO(MAX)

The process returns to step ST2502, and domain designation information designating a reduced frequency domain is applied to the frequency domain determining section 20. Thereafter, steps ST2503 to ST2506 are conducted again.

(2) For DINFO>DINFO(MAX)

The process returns to step ST2502, and domain designation information designating an increased frequency domain is applied to the frequency domain determining section 20. Thereafter, steps ST2503 to ST2506 are conducted again.

(3) For DINFO≈DINFO(MAX)

The process proceeds to step ST702.

In this way, the domain designation information is adjusted so that the maximum value DINFO(MAX) becomes nearly equal to the data amount DINFO. Once the domain designation information satisfying DINFO≈DINFO (MAX) (DINFO≦DINFO(MAX)) is obtained, the embedding operation is conducted in steps ST702 to ST708 according to that domain designation information.

[Effects]

As has been described above, the information embedding apparatus of the sixth embodiment conducts the preprocessing (steps ST2501 to ST2506). The domain designation information thus obtained is such that the maximum value DINFO(MAX) of the data amount of watermark information that can be embedded in the frequency domain designated by the domain designation information is nearly equal to the data amount of watermark information to be embedded, DINFO. This prevents the embedding operation from being conducted again.

The original additional bits (i.e., the additional bits before embedding the watermark information) vary as a result of embedding the watermark information therein. This causes degradation in quality of the restored image. However, the information embedding apparatus of the sixth embodiment sets the frequency domain for embedding the watermark information as small as possible. Accordingly, degradation in quality of the restored image can be minimized.

Note that the same effects as those of the second embodiment can be obtained by the information embedding apparatus of the sixth embodiment.

The watermark information is herein embedded in the image data compressed in a JPEG format. However, the same effects can be obtained even when the watermark information is embedded in the image data compressed in an MPEG format.

The information embedding apparatus of the sixth embodiment does not necessarily require hardware configuration, but may be implemented by software.

(Seventh Embodiment)

[Embedding of Watermark Information]

Figure 26:
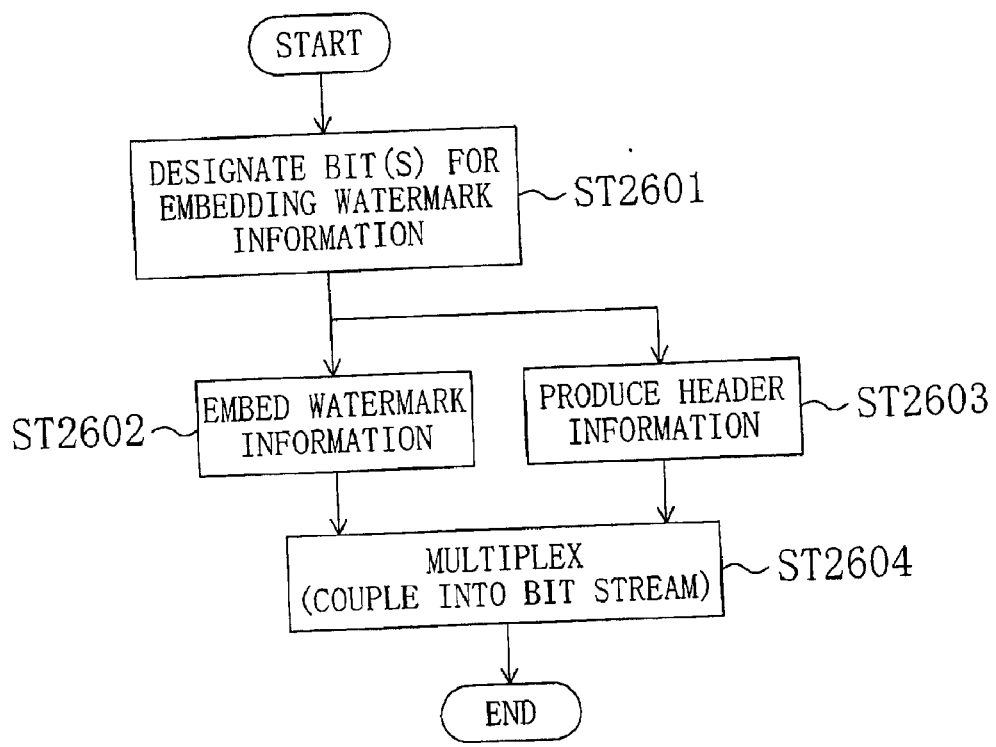
FIG. 26 is a flowchart illustrating a method for embedding watermark information according to a seventh embodiment of the present invention.

FIG. 26 is a flowchart illustrating a method for embedding watermark information according to the seventh embodiment of the present invention. The embedding method of FIG. 26 is characterized by producing header information and multiplexing the header information with a variable length code. The header information indicates which of the additional bits has the watermark information embedded therein. This embedding method will now be described with reference to FIG. 26.

First, in step ST2601, a bit(s) for embedding the watermark information is designated from the additional bits.

In step ST2602, the watermark information is embedded in the bit(s) designated in step ST2601. The embedding operation is conducted in the same manner as that described in the first embodiment.

In parallel with step ST2602, header information is produced in step ST2603. The header information indicates which of the additional bits has the watermark information embedded therein.

Figure 27:
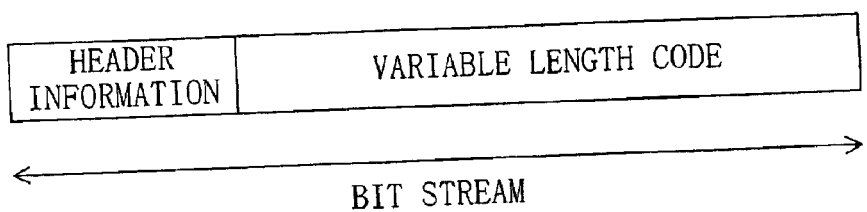
FIG. 27 shows the structure of bit stream data.

In step ST2604, the header information produced in step ST2603 and the variable length code having the watermark information embedded therein in step ST2602 are multiplexed (i.e., coupled into a bit stream) to produce the bit stream data as shown in FIG. 27.

[Retrieval of Watermark Information]

Figure 28:
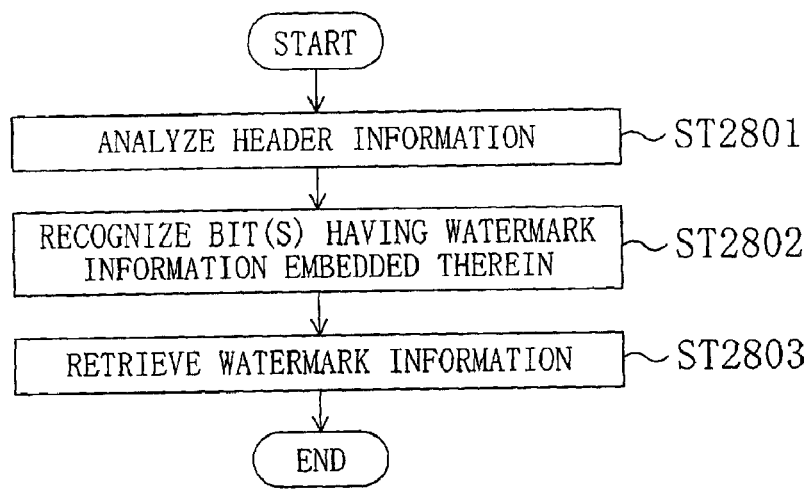
FIG. 28 is a flowchart illustrating a method for retrieving watermark information according to the seventh embodiment of the present invention.

FIG. 28 is a flowchart illustrating a method for retrieving the watermark information from the bit stream data produced by the embedding method of FIG. 26. This retrieving method will now be described with reference to FIG. 28.

First, in step ST2801, the header information in the bit stream data is analyzed. As described above, the header information indicates which of the additional bits has the watermark information embedded therein.

In step ST2802, the bit(s) having the watermark information embedded therein are recognized from the analysis result.

In step ST2803, the additional bits are sequentially extracted by the variable length decoding operation. This variable length decoding operation is the same as step ST703 of FIG. 7. The data of the bit(s) recognized in step ST2802 is retrieved from the extracted additional bits. In this way, the watermark information is retrieved.

[Effects]

As has been described above, in the method for embedding the watermark information according to the seventh embodiment, the header information indicating which of the additional bits has the watermark information embedded therein is multiplexed with the variable length code. In the method for retrieving the watermark information according to the seventh embodiment, the bit(s) having the watermark information embedded therein is recognized based on the header information, and the data of the recognized bit(s) is retrieved from the additional bits extracted by the variable length decoding operation. Accordingly, the embedded watermark information can be retrieved correctly.

(Eighth Embodiment)

[Embedding of Watermark Information]

Figure 29:
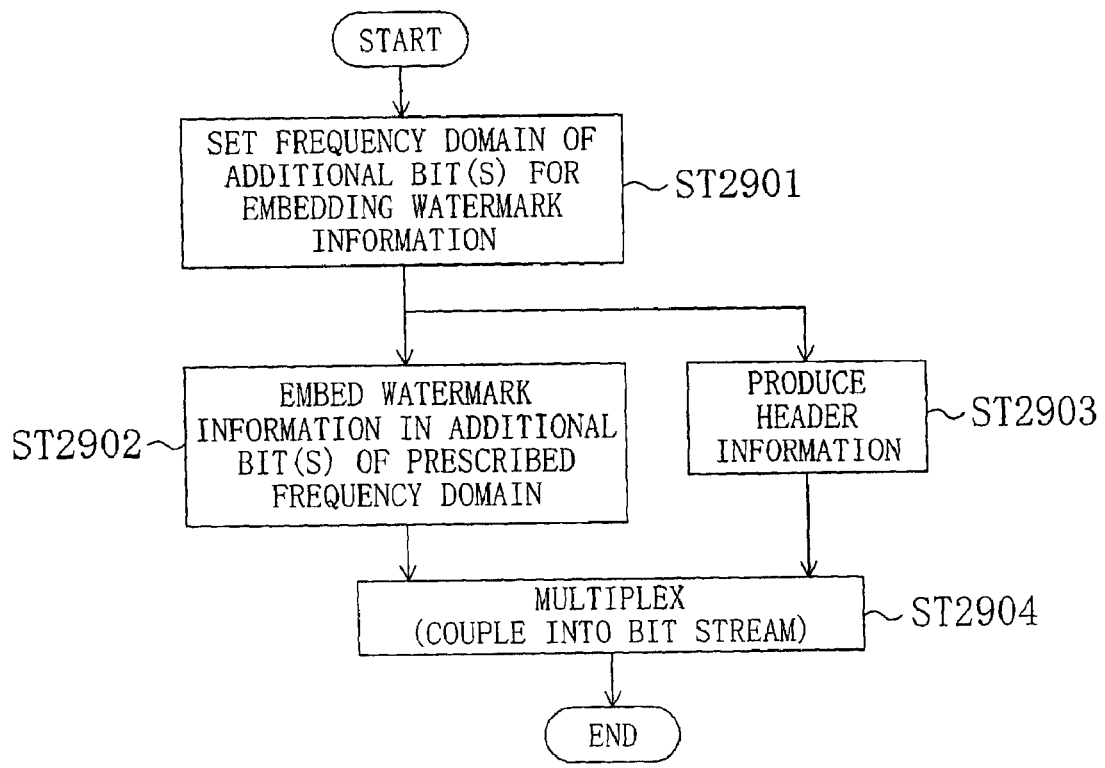
FIG. 29 is a flowchart illustrating a method for embedding watermark information according to an eighth embodiment of the present invention.

FIG. 29 is a flowchart illustrating a method for embedding watermark information according to the eighth embodiment of the present invention. The embedding method of FIG. 29 is characterized by producing header information and multiplexing the header information with a variable length code. The header information indicates the frequency domain of the additional bit(s) having the watermark information embedded therein. This embedding method will now be described with reference to FIG. 29.

First, in step ST2901, a frequency domain of the additional bit(s) for embedding the watermark information is designated.

In step ST2902, the watermark information is embedded in the additional bit(s) in the designated frequency domain. The embedding operation is conducted in the same manner as that described in the second embodiment.

In parallel with step ST2902, header information is produced in step ST2903. The header information indicates the frequency domain of the additional bit(s) having the watermark information embedded therein.

In step ST2904, the header information produced in step ST2903 and the variable length code having the watermark information embedded therein in step ST2902 are multiplexed (i.e., coupled into a bit stream) to produce the bit stream data as shown in FIG. 27.

[Retrieval of Watermark Information]

Figure 30:
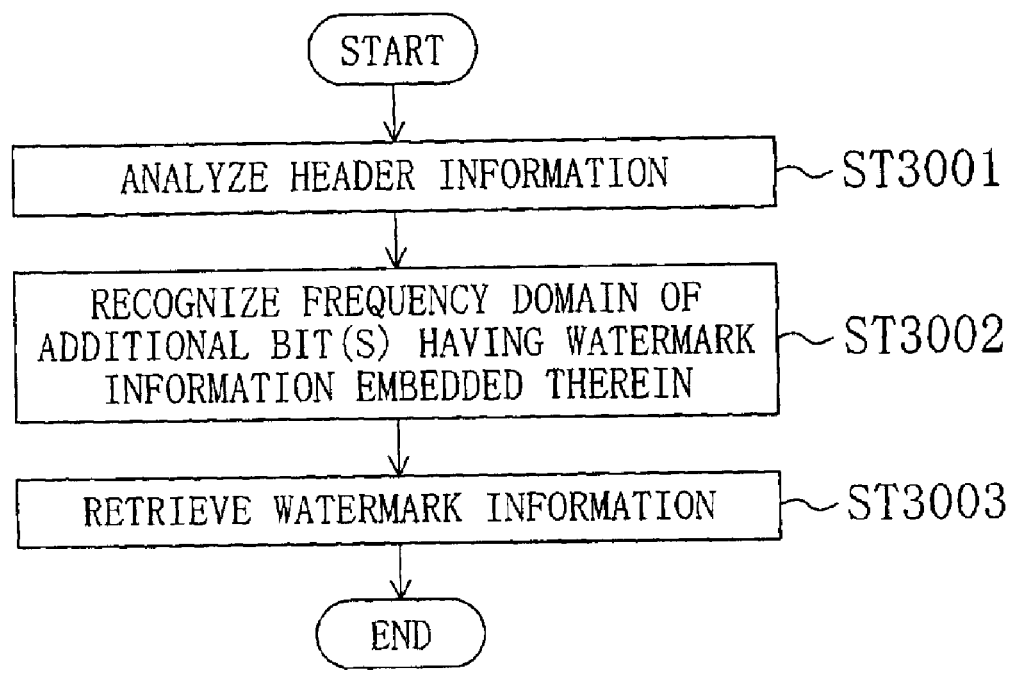
FIG. 30 is a flowchart illustrating a method for retrieving watermark information according to the eighth embodiment of the present invention.
Figure 31:
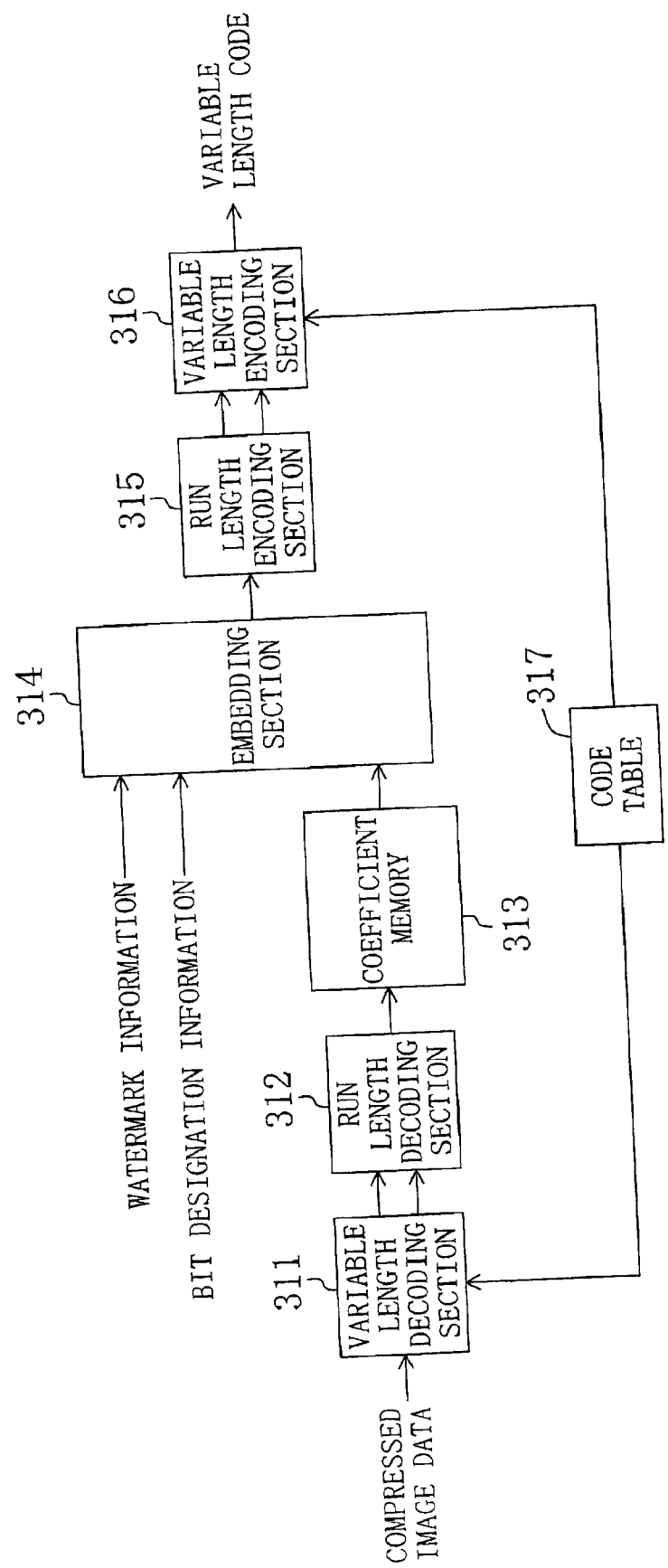
FIG. 31 is a block diagram showing the overall structure of a conventional information embedding apparatus.

FIG. 30 is a flowchart illustrating a method for retrieving the watermark information from the bit stream data produced by the embedding method of FIG. 29. This retrieving method will now be described with reference to FIG. 30.

First, in step ST3001, the header information in the bit stream data is analyzed. As described above, the header information indicates the frequency domain of the additional bit(s) having the watermark information embedded therein.

In step ST3002, the frequency domain of the additional bit(s) having the watermark information embedded therein is recognized from the analysis result.

In step ST3003, the additional bits are sequentially extracted by the variable length decoding operation. Of the extracted additional bits, the data of a prescribed bit(s) in the frequency domain recognized in step ST3002 is retrieved. The prescribed bit(s) is a bit(s) that is designated in advance as a bit for embedding the watermark information. In this way, the watermark information is retrieved.

[Effects]

As has been described above, in the method for embedding the watermark information according to the eighth embodiment, the header information (information that indicates the frequency domain of the additional bit(s) having the watermark information embedded therein) is multiplexed with the variable length code. In the method for retrieving the watermark information according to the eighth embodiment, the frequency domain of the additional bit(s) having the watermark information embedded therein is recognized based on the header information. Thereafter, of the additional bits extracted by the variable length decoding operation, the watermark information is retrieved from the additional bit(s) in the frequency domain. Accordingly, the embedded watermark information can be retrieved correctly.

What is claimed is:

1. An apparatus for embedding watermark information in image data compressed by orthogonal transformation, quantization, run length encoding and variable length encoding, comprising:

a variable length decoding means for extracting a codeword and an additional bit or bits corresponding to the codeword from the compressed image data based on a code table;

an embedding means for embedding watermark information in a prescribed bit of the additional bits extracted by the variable length decoding means; and a connecting means for connecting the additional bits having the watermark information embedded therein by the embedding means with the codeword extracted by the variable length decoding means to produce a variable length code.

2. The apparatus according to claim 1, further comprising a domain determining means for determining whether the codeword extracted by the variable length decoding means is included in a first frequency domain or not, wherein the embedding means embeds the watermark information in the prescribed bit of the additional bits corresponding to the codeword determined as being included in the first frequency domain by the domain determining means.

3. The apparatus according to claim 2, wherein the variable length decoding means further extracts a codeword from the compressed image data based on the code table as preprocessing of the extracting operation, and the domain determining means further determines whether the codeword extracted by the variable length decoding means in the preprocessing is included in a second frequency domain or not, the apparatus further comprising a domain codeword counter for counting the number of codewords determined as being included in the second frequency domain by the domain determining means.

4. The apparatus according to claim 3, further comprising a frequency domain designating means for designating the first frequency domain based on the number of codewords counted by the domain codeword counter.

5. The apparatus according to claim 2, further comprising:
a means for producing header information that indicates a frequency domain of the additional bit having the watermark information embedded therein by the embedding means; and
a means for multiplexing the header information produced by the header information producing means with the variable length code produced by the connecting means.

6. An apparatus for retrieving watermark information from compressed image data having watermark information embedded therein by the apparatus according to claim 5, comprising:

an analyzing means for recognizing a frequency domain of an additional bit having the watermark information embedded therein, based on the header information;

a variable length decoding means for extracting an additional bit or bits from the compressed image data based on a code table; and a means for retrieving data of the prescribed bit of the additional bits extracted by the variable length decoding means when the extracted additional bits are included in the frequency domain recognized by the analyzing means.

7. The apparatus according to claim 1, further comprising a bit length determining means for determining whether the additional bits extracted by the variable length decoding means have a prescribed bit length or not, wherein the embedding means embeds the watermark information in the prescribed bit of the additional bits determined as having the prescribed bit length by the bit length determining means.

8. The apparatus according to claim 1, further comprising a color component determining means for determining whether a color component of the codeword extracted by the variable length decoding means is a prescribed color component or not, wherein the embedding means embeds the watermark information in the prescribed bit of the additional bits corresponding to the codeword determined as being the prescribed color component by the color component determining means.

9. The apparatus according to claim 1, wherein the variable length decoding means further extracts a codeword from the compressed image data based on the code table as preprocessing of the extracting operation, the apparatus further comprising a codeword counter for counting the number of codewords extracted by the variable length decoding means as the preprocessing.

10. The apparatus according to claim 9, further comprising a bit designating means for designating the prescribed bit for embedding the watermark information, based on the number of codewords counted by the codeword counter.

11. The apparatus according to claim 1, further comprising: a means for producing header information that indicates which of the additional bits has the watermark information embedded therein; and a means for multiplexing the header information produced by the header information producing means with the variable length code produced by the connecting means.

12. An apparatus for retrieving watermark information from compressed image data having watermark information embedded therein by the apparatus according to claim 11, comprising:

an analyzing means for recognizing the prescribed bit having the watermark information embedded therein, based on the header information;

a variable length decoding means for extracting an additional bit or bits from the compressed image data based on a code table; and a means for retrieving data of the prescribed bit recognized by the analyzing means from the additional bits extracted by the variable length decoding means.

13. A method for embedding watermark information in image data compressed by orthogonal transformation, quantization, run length encoding and variable length encoding, comprising the steps of:

extracting a codeword and an additional bit or bits corresponding to the codeword from the compressed image data based on a code table;

embedding watermark information in a prescribed bit of the additional bits extracted by the extracting step; and connecting the additional bits having the watermark information embedded therein by the embedding step with the codeword extracted by the extracting step to produce a variable length code.

14. The method according to claim 13, wherein the compressed image data having the watermark information embedded therein by the method according to claim 13 is restored, and the extracting step, the embedding step and the connecting step are conducted again with a reduced number of prescribed bits according to a degree of degradation in quality of the restored image.

15. The method according to claim 13, wherein when part of the watermark information to be embedded fails to be embedded, the extracting step, the embedding step and the connecting step are conducted again with an increased number of prescribed bits.

16. The method according to claim 13, further comprising the step of determining whether the codeword extracted by the extracting step is included in the first frequency domain or not, wherein in the embedding step, the watermark information is embedded in the prescribed bit of the additional bits corresponding to the codeword determined as being included in the first frequency domain by the determining step.

17. The method according to claim 16, wherein the compressed image data having the watermark information embedded therein by the method according to claim 16 is restored, and the extracting step, the embedding step and the connecting step are conducted again with a reduced first frequency domain according to a degree of degradation in quality of the restored image.

18. The method according to claim 16, wherein when part of the watermark information to be embedded fails to be embedded, the extracting step, the embedding step and the connecting step are conducted again with an increased first frequency domain.

19. The method according to claim 16, wherein preprocessing of the extracting step includes the steps of extracting a codeword from the compressed image data based on the code table, determining whether the extracted codeword is included in a second frequency domain or not, and counting the number of codewords determined as being included in the second frequency domain.

20. The method according to claim 19, wherein the preprocessing further includes the step of designating the first frequency domain based on the number of codewords counted by the counting step.

21. The method according to claim 16, further comprising the step of multiplexing header information with the variable length code produced by the connecting step, the header information indicating a frequency domain of the additional bit having the watermark information embedded therein by the embedding step.

22. A method for retrieving watermark information from compressed image data having watermark information embedded therein by the method according to claim 21, comprising the steps of:

recognizing a frequency domain of an additional bit having the watermark information embedded therein, based on the header information;

extracting an additional bit or bits from the compressed image data based on a code table; and retrieving data of the prescribed bit of the additional bits extracted by the extracting step when the extracted additional bits are included in the frequency domain recognized by the recognizing step.

23. The method according to claim 13, further comprising the step of determining whether the additional bits extracted by the extracting step have a prescribed bit length or not, wherein in the embedding step, the watermark information is embedded in the prescribed bit of the additional bits determined as having the prescribed bit length by the determining step.

24. The method according to claim 23, wherein the compressed image data having the watermark information embedded therein by the method according to claim 19 is restored, and the extracting step, the embedding step and the connecting step are conducted again with a reduced range of the prescribed bit length according to a degree of degradation in quality of the restored image.

25. The method according to claim 23, wherein when part of the watermark information to be embedded fails to be embedded, the extracting step, the embedding step and the connecting step are conducted again with an increased range of the prescribed bit length.

26. The method according to claim 13, further comprising the step of determining whether a color component of the codeword extracted by the extracting step is a prescribed color component or not, wherein in the embedding step, the watermark information is embedded in the prescribed bit of the additional bits corresponding to the codeword determined as being the prescribed color component by the determining step.

27. The method according to claim 26, wherein the compressed image data having the watermark information embedded therein by the method according to claim 22 is restored, and the extracting step, the embedding step and the connecting step are conducted again with a different prescribed color component according to a degree of degradation in quality of the restored image.

28. The method according to claim 13, wherein preprocessing of the extracting step includes the steps of extracting a codeword from the compressed image data based on the code table, and counting the number of extracted codewords.

29. The method according to claim 28, wherein the preprocessing further includes the step of designating the prescribed bit for embedding the watermark information, based on the number of codewords counted by the counting step.

30. The method according to claim 13, further comprising the step of multiplexing header information with the variable length code produced by the connecting step, the header information indicating which of the additional bits has the watermark information embedded therein.

31. A method for retrieving watermark information from compressed image data having watermark information embedded therein by the method according to claim 30, comprising the steps of:

recognizing the prescribed bit having the watermark information embedded therein, based on the header information;

extracting an additional bit or bits from the compressed image data based on a code table; and retrieving data of the prescribed bit recognized by the recognizing step from the additional bits extracted by the extracting step.

\* \* \* \* \*